US012775462B2

(12) United States Patent
Leber et al.

(10) Patent No.: US 12,775,462 B2
(45) Date of Patent: Oct. 27, 2026

(54) INSTRUCTION WITH A PRESERVE SIGN CONTROL

(71) Applicant: INTERNATIONAL BUSINESS MACHINES CORPORATION, Armonk, NY (US)

(72) Inventors: Petra Leber, Ehningen (DE); Kerstin Claudia Schelm, Stuttgart (DE); Michael Klein, Schoenaich (DE); Andreas Wagner, Wildberg (DE); Reid Copeland, Ontario (CA); Xin Guo, Toronto (CA); Jonathan D. Bradbury, Poughkeepsie, NY (US); Timothy Slegel, Staatsburg, NY (US); Bruce Conrad Giamei, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 11 days.

(21) Appl. No.: 18/641,656

(22) Filed: Apr. 22, 2024

(65) Prior Publication Data

US 2025/0328346 A1 Oct. 23, 2025

(51) Int. Cl.
*G06F 9/30* (2018.01)

(52) U.S. Cl.
CPC ...... *G06F 9/30014* (2013.01); *G06F 9/30032* (2013.01); *G06F 9/30025* (2013.01)

(58) Field of Classification Search
CPC ............. G06F 9/30014; G06F 9/30032; G06F 9/30025
See application file for complete search history.

(56) References Cited

U.S. PATENT DOCUMENTS 5,754,805 A * 5/1998 Gallup ................ G06F 9/30014 712/E9.055
10,175,946 B2 * 1/2019 Bradbury ................ G06F 7/544
(Continued)

FOREIGN PATENT DOCUMENTS

WO 2020/165668 A1 8/2020

OTHER PUBLICATIONS

IBM, "z/Architecture Principles of Operation," IBM Publication No. SA22-7832-13, Fourteenth Edition, May 2022, pp. 1-2124.
(Continued)

*Primary Examiner* — Corey S Faherty
(74) *Attorney, Agent, or Firm* — Edward J. Wixted, III; Blanche E. Schiller, Esq.; Heslin Rothenberg Farley & Mesiti P.C.

(57) ABSTRACT

An instruction is executed to obtain a result that includes an output value and a result sign code. At least one operation is performed on at least a portion of a source value to provide the output value. The source value is located in a source location which includes a source position to include the source value and a source sign position to include a sign code of the source value. One or more controls of the instruction, including a preserve sign control, are checked to determine the result sign code. Based on, at least, the value of the preserve sign control being set to enabled, the result sign code is the sign code in the source sign position unmodified. The unmodified sign code is provided as the result sign code. The result including the output value and the result sign code is provided.

25 Claims, 8 Drawing Sheets

(56) References Cited

U.S. PATENT DOCUMENTS

| | | | | |
|---|---|---|---|---|
| 10,346,134 | B2 | 7/2019 | Bradbury et al. | |
| 11,023,205 | B2 | 6/2021 | Lichtenau et al. | |
| 11,442,726 | B1 * | 9/2022 | Schwarz | G06F 9/30025 |
| 2018/0095727 | A1 | 4/2018 | Bradbury et al. | |
| 2018/0095755 | A1 | 4/2018 | Bradbury et al. | |
| 2020/0264890 | A1 | 8/2020 | Lichtenau et al. | |
| 2022/0276866 | A1 * | 9/2022 | Schwarz | G06F 9/30025 |

OTHER PUBLICATIONS

International Searching Authority, "Notification of Transmittal of the International Search Report and the Written Opinion of the International Searching Authority, or Declaration," Patent Cooperation Treaty, Jul. 18, 2025, 10 pages, International Application No. PCT/EP2025/059396.

* cited by examiner

| 460 | 462 | 464 | 466 | 468 | 470 | 472 | 474 | 476 | 478 |
|---|---|---|---|---|---|---|---|---|---|
| Sign Operation | Result Magnitude (after RDC applied) | $V_2$ Sign | Preserve Sign | Positive Sign Code | Negative Zero | $V_2$ Sign Code Validity Check | $V_2$ Digit Code Validity Check perform if... | Result Sign Code (hex) | Condition Code[d] |
| 00 (maintain) | nonzero[a] | positive | 0 | 0 | - | NV=0 | NV=0 | C positive | 2 |
| 00 (maintain) | nonzero[a] | positive | 0 | 1 | - | NV=0 | NV=0 | F positive | 2 |
| 00 (maintain) | nonzero[a] | negative | 0 | - | - | NV=0 | NV=0 | D negative | 1 |
| 00 (maintain) | nonzero[a] | invalid[b] | 0 | - | - | NV=0 | NV=0 | 2nd operand sign | 2 |
| 00 (maintain) | zero[a] | positive | 0 | 0 | - | NV=0 | NV=0 | C positive | 0 |
| 00 (maintain) | zero[a] | positive | 0 | 1 | - | NV=0 | NV=0 | F positive | 0 |
| 00 (maintain) | zero[a] | negative | 0 | 0 | 0 | NV=0 | NV=0 | C positive | 0 |
| 00 (maintain) | zero[a] | negative | 0 | 1 | 0 | NV=0 | NV=0 | F positive | 0 |
| 00 (maintain) | zero[a] | negative | 0 | - | 1 | NV=0 | NV=0 | D negative | 0 |
| 00 (maintain) | zero[a] | invalid[b] | 0 | - | - | NV=0 | NV=0 | 2nd operand sign | 0 |
| 00 (maintain) | nonzero[a] | positive | 1 | - | - | NV=0 | NV=0 | 2nd operand sign | 2 |
| 00 (maintain) | nonzero[a] | negative | 1 | - | - | NV=0 | NV=0 | 2nd operand sign | 1 |
| 00 (maintain) | nonzero[a] | invalid[b] | 1 | - | - | NV=0 | NV=0 | 2nd operand sign | 2 |
| 00 (maintain) | zero[a] | - | 1 | - | - | NV=0 | NV=0 | 2nd operand sign | 0 |
| 01 (complement) | nonzero[a] | positive | - | - | - | always | NV=0 | D negative | 1 |
| 01 (complement) | nonzero[a] | negative | - | 0 | - | always | NV=0 | C positive | 2 |
| 01 (complement) | nonzero[a] | negative | - | 1 | - | always | NV=0 | F positive | 2 |
| 01 (complement) | - | invalid[b] | - | - | - | always | NV=0 | -[c] | -[c] |
| 01 (complement) | zero[a] | positive | - | 0 | 0 | always | NV=0 | C positive | 0 |
| 01 (complement) | zero[a] | positive | - | 1 | 0 | always | NV=0 | F positive | 0 |
| 01 (complement) | zero[a] | positive | - | - | 1 | always | NV=0 | D negative | 0 |
| 01 (complement) | zero[a] | negative | - | 0 | - | always | NV=0 | C positive | 0 |
| 01 (complement) | zero[a] | negative | - | 1 | - | always | NV=0 | F positive | 0 |
| 10 (force positive) | nonzero[a] | - | - | 0 | - | SV=1 | NV=0 | C positive | 2 |
| 10 (force positive) | nonzero[a] | - | - | 1 | - | SV=1 | NV=0 | F positive | 2 |
| 10 (force positive) | zero[a] | - | - | 0 | - | SV=1 | NV=0 | C positive | 0 |
| 10 (force positive) | zero[a] | - | - | 1 | - | SV=1 | NV=0 | F positive | 0 |
| 11 (force negative) | nonzero[a] | - | - | - | - | SV=1 | NV=0 | D negative | 1 |
| 11 (force negative) | zero[a] | - | - | 0 | 0 | SV=1 | NV=0 | C positive | 0 |
| 11 (force negative) | zero[a] | - | - | 1 | 0 | SV=1 | NV=0 | F positive | 0 |
| 11 (force negative) | zero[a] | - | - | - | 1 | SV=1 | NV=0 | D negative | 0 |

FIG. 4E

INSTRUCTION WITH A PRESERVE SIGN CONTROL

BACKGROUND

One or more aspects relate, in general, to facilitating processing within a computing environment, and in particular, to improving processing within the computing environment.

Computer programs executing within a computing environment perform operations on data. The data may be in one of a plurality of formats. For instance, the data may be in a signed packed decimal format. In such a format, each digit of a decimal number (e.g., 0-9) is encoded as a binary value and stored in a nibble (e.g., four bits) of a byte (e.g., eight bits). The sign of the decimal number, if any, is stored, for instance, in the rightmost nibble of the rightmost byte of the representation. The sign may be encoded as a binary representation of A-F, and multiple codes may be used to represent positive or negative. For instance, positive may be represented by A, C, F and negative may be represented by B, D; other examples are possible. Further, there may be default encodings for positive and/or negative.

Operations that may be performed on the data, such as signed packed decimal numbers or other data, include computational operations, as well as moving or copying data from a source to a target location. For the move or copy operation, the target location may be the same size as the source location, smaller than the source location (a truncating move/copy) or larger than the source location (a widening move/copy). Move and truncate (or copy and truncate) operations may be performed to ignore/remove unnecessary digits of a decimal value providing a resulting value, which may have a sign.

To perform the move or copy (and truncate) operations, a computer programming language, such as COBOL, uses general purpose instructions, such as move character and logical AND instructions, to move or copy digits and truncate unnecessary digits. These general-purpose instructions are in-memory instructions that require the use of memory in performing the operations.

Improvements to instructions that operate on data, including those that operate on data having a sign, are sought to improve processing within the computing environment.

SUMMARY

Shortcomings of the prior art are overcome, and additional advantages are provided through the provision of a computer program product. The computer program product includes a set of one or more computer readable storage media and program instructions, collectively stored in the set of one or more computer readable storage media, for causing at least one computing device to perform computer operations including executing an instruction to obtain a result of the instruction including an output value and a result sign code. The executing the instruction includes performing at least one operation on at least a portion of a source value to provide the output value of the result. The source value is located in a source location, and the source location includes a source position to include the source value and a source sign position to include a sign code of the source value. One or more controls of the instruction are checked to be used in determining the result sign code. The one or more controls of the instruction include a preserve sign control. Based on, at least, the value of the preserve sign control being set to enabled, it is determined that the result sign code is the sign code in the source sign position of the source location unmodified. The sign code in the source sign position of the source location, unmodified, is provided as the result sign code. The result including the output value and the result sign code is provided.

In one aspect, a computer program product is provided. The computer program product includes a set of one or more computer readable storage media, and program instructions, collectively stored in the set of one or more computer readable storage media, for causing at least one computing device to perform computer operations including executing an instruction to perform one or more operations on a source value included in at least one source register specified using one or more fields of the instruction. The source value includes a plurality of digits in a source digits position of the at least one source register and a sign code in a source sign position of the at least one source register. The executing the instruction includes placing a specified number of digits of the plurality of digits in the source digits position of the at least one source register in a target digits position of at least one target register and setting one or more other digits in the target digits position to a selected value. A result sign code to be placed in a target sign position of the at least one target register is determined. The determining includes checking one or more controls of the instruction to be used in determining the result sign code. The one or more controls of the instruction include a preserve sign control, and based on, at least, the value of the preserve sign control being set to enabled, the result sign code placed in the target sign position of the at least one target register is the sign code in the source sign position unmodified. An output of the instruction is provided based on execution of the instruction, and the output includes the at least one target register.

In one aspect, a computer program product is provided. The computer program product includes a set of one or more computer readable storage media, and program instructions, collectively stored in the set of one or more computer readable storage media, for causing at least one computing device to perform computer operations including executing an instruction to perform one or more operations on a source value included in at least one source register specified using one or more fields of the instruction. The source value includes a plurality of digits in a source digits position of the at least one source register and a sign code in a source sign position of the at least one source register. The executing the instruction includes placing a specified number of digits of the plurality of digits in the source digits position of the at least one source register in a target digits position of at least one target register and setting one or more other digits in the target digits position to a selected value. A result sign code to be placed in a target sign position of the at least one target register is determined. The determining includes checking one or more controls of the instruction to be used in determining the result sign code. The one or more controls of the instruction include a preserve sign control, and based on the value of the preserve sign control being set to unenabled indicating that the sign code is not being preserved, the checking the one or more controls includes checking a plurality of controls of the instruction to be used in determining the result sign code to be placed in the target sign position of the at least one target register. An output of the instruction is provided based on execution of the instruction, and the output includes the at least one target register.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4E depicts one example of an operations table of the Vector Perform Sign Operation Decimal instruction of FIG. 4A, in accordance with one or more aspects of the present disclosure;

DETAILED DESCRIPTION

Figure 1:
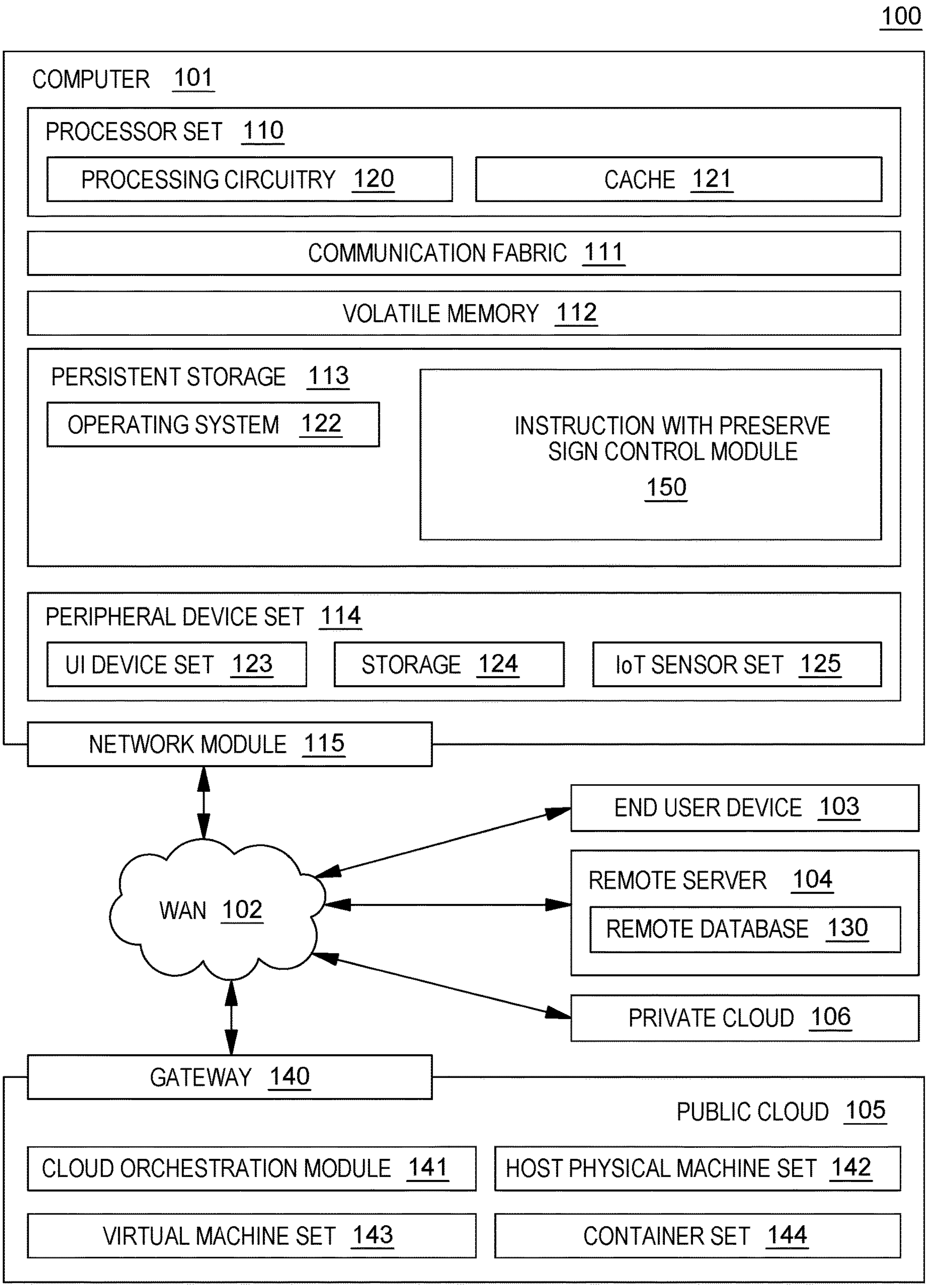
FIG. 1 depicts one example of a computing environment to incorporate and use one or more aspects of the present disclosure.

In accordance with one or more aspects of the present disclosure, a capability is provided to facilitate processing within a computing environment. In one aspect, the capability includes facilitating processing of instructions that perform operations in which a sign code of a selected value is to be preserved. In one or more aspects, the selected value is a source value; however, in other aspects, the selected value may be other than a source value. In one example, the sign code is a value, such as one or more binary digits, that is intended to represent a sign of the selected value (e.g., source value). In one or more aspects, the sign code is the value (e.g., one or more binary digits) in a specific position within a selected location. As an example, the selected location is a source location; however, the selected location may be other than source locations.

In one or more aspects, the preserving of the sign code includes providing the sign code of the source location, unmodified, as a result sign code. The sign code of the source location is not modified, checked for validity, etc.; it is just used, as is, as the result sign code. In one example, the providing the sign code of the source location, unmodified, as the result sign code includes copying the sign code from a sign position of the source location (referred to herein as a source sign position) to a sign position of a target location (referred to herein as a target sign position) without modifying the sign code. The sign code at the target sign position is referred to herein as a result sign code. In another example, the providing the sign code of the source location, unmodified, as the result sign code includes moving the sign code from the source sign position to the target sign position without modifying the sign code. Other examples are possible.

In one example, the source location is one or more registers (referred to herein as source registers) or other source locations, and the sign position includes, for instance, one or more bit positions (e.g., a nibble (e.g., four bits) of a byte (e.g., eight bits)) of the source location. The one or more bit positions include one or more bits representing the sign code. For instance, a sign code of 1100 (e.g., representing a sign of positive) includes four bits (e.g., a bit per binary digit), and the four-bit positions that include those four bits are referred to as the sign position. If the sign position is in a source location, i.e., a location that includes a source value, then the sign position is referred to herein for clarity as a source sign position. Similarly, if the sign position is in a target location, i.e., a location that includes a target value or a result, the sign position is referred to herein for clarity as a target sign position. Other examples are possible.

In one or more aspects, the preserving of the sign code includes providing the sign code that is in the source sign position to the target sign position, such that the sign code (also referred to as an encoding of the sign) is passed-through to the target sign position without modification. The one or more digits (e.g., binary digits) of the sign code are not modified or tested for validity, etc., prior or subsequent to providing the sign code of the source sign position to the target sign position. In one example, if an encoding in the sign position of the source value is 1100 (positive), then that exact encoding (1100) is passed-through from the source sign position of the target sign position, even if another encoding of a positive sign digit (1111 or other) may be used. Other examples are possible.

In one or more aspects, as used herein, the preserving a sign or the preserving of a sign code is distinct from maintaining the sign or maintaining the sign code. The preserving the sign or the sign code provides the sign code that is in, e.g., the source sign position to, e.g., the target sign position without consideration of what the encoding of the sign code is or whether the encoding is valid, and without modification; and the maintaining the sign or maintaining the sign code indicates that the value of the sign (e.g., positive, negative) is to be maintained. That is, if the value of the sign in the source value is positive, then it is positive in the target value; however, the encoding of the positive value in the source value (i.e., the sign code) may be different than the encoding of the positive value in the target value. For instance, when a sign is maintained, it may be represented by any one of a plurality of encodings that represent the value of that sign. As an example, when a sign of positive is maintained, it may be represented by 1100 or 1111; however, when a sign of positive is preserved, then the same encoding (e.g., 1100) is used without modification. Other examples are possible.

One example of an operation in which a sign code is to be preserved is a move and truncate operation in which a portion of a source value (e.g., a portion of a decimal number) is placed in a target location (e.g., moved or copied to a target location) and another portion of the source value (e.g., another portion of the decimal number) is truncated (i.e., missing from the target location), while preserving the sign code. Truncation implies, for instance, that the target location is not large enough to include the entire source value. For instance, a specification of the length of the target location (e.g., in bytes, digits, etc.) is not of a sufficient size to include all the possible significant digits or bytes of the source value. Actual truncation may not occur at runtime based on the data for a particular operation but statically the runtime data is not known, so truncation is to be accounted for, in some manner, at compilation time. Thus, for fixed size registers (e.g., the vector registers used herein), truncation includes placing a selected value (e.g., zeros) in the target location at the digit positions where the digits are being truncated.

In accordance with one or more aspects, a single instruction (e.g., a single architected instruction) is defined and configured to perform a move data operation (e.g., place (e.g., move, copy) a portion of a source value, such as a portion of a decimal number, to a target location (e.g., result, target register, etc.)), truncate data (e.g., another portion of the source value is missing from the target location—clear one or more digit positions of the target location (e.g., set to a selected value, such as zero)) and preserve the sign code of the source value (e.g., pass-through a sign code of the source value to the target location without modifying the sign code). The use of a single architected instruction to perform the move, truncate and preservation of the sign code reduces the use of resources and improves performance.

In one or more aspects, the single architected instruction uses registers (e.g., hardware registers instead of memory) to perform the move data, truncate data, and preserve the sign code. The use of a single architected instruction that uses registers to perform these operations improves performance by avoiding in-memory stores of the data while processing the operations; instead, hardware registers are used, reducing or eliminating the latency resulting from storing the data to memory and retrieving the data from memory.

In one or more aspects, a computer program product is provided. The computer program product includes a set of one or more computer readable storage media, and program instructions, collectively stored in the set of one or more computer readable storage media, for causing at least one computing device to perform computer operations including executing an instruction to obtain a result of the instruction including an output value and a result sign code. The executing the instruction includes performing at least one operation on at least a portion of a source value to provide the output value of the result. The source value is located in a source location, and the source location includes a source position to include the source value and a source sign position to include a sign code of the source value. One or more controls of the instruction are checked to be used in determining the result sign code. The one or more controls of the instruction include a preserve sign control. Based on, at least, the value of the preserve sign control being set to enabled, it is determined that the result sign code is the sign code in the source sign position of the source location unmodified. The sign code in the source sign position of the source location, unmodified, is provided as the result sign code. The result including the output value and the result sign code is provided. By providing the sign code of the source value unmodified, an instruction, such as a single architected instruction, is able to pass-through the sign code of the source value to a result without modifying the sign code. This provides efficiencies when pass-through operations are to be performed. The execution of a single instruction to perform at least one operation and to pass-through the sign code saves resources and improves performance. For instance, path length is shortened improving performance. Further, use of the preserve sign control allows for more compact code reducing storage for the program text and more optimal use of scarce instruction cache resources.

Additionally, or alternatively, in one or more embodiments, the providing, unmodified, the sign code in the source sign position of the source location as the result sign code includes copying a plurality of digits in the source sign position of the source location as the result sign code. By copying the sign code of the source value unmodified, an instruction, such as a single architected instruction, is able to pass-through the sign code of the source value to a result without modifying the sign code. This provides efficiencies when pass-through operations are to be performed, improving performance within a computing environment.

Additionally, or alternatively, in one or more embodiments, the plurality of digits includes a plurality of binary digits copied from the source sign position of the source location regardless of the sign code and regardless of validity of the sign code. By copying the plurality of binary digits unmodified and unvalidated, an instruction, such as a single architected instruction, is able to pass-through the sign code of the source value to a result without modifying the sign code. This provides efficiencies when pass-through operations are to be performed, improving performance within a computing environment.

Additionally, or alternatively, in one or more embodiments, the at least one operation includes a move operation in which a selected portion of the source value is placed in one part of the output value of the result. A single instruction is able to perform multiple operations including a move operation and a preservation of the sign code, reducing the use of system resources and improving performance.

Additionally, or alternatively, in one or more embodiments, based on the move operation, another portion of the source value is truncated in that it is missing from the output value. A single instruction is able to perform multiple operations including a move operation, a truncate operation and a preservation of the sign code, reducing the use of system resources and improving performance.

Additionally, or alternatively, in one or more embodiments, the at least one operation further includes a truncate operation in which another portion of the source value is missing from the output value and another part of the output value is set to a selected value. A single instruction is able to perform multiple operations including a move operation, a truncate operation by setting another part of the output value to a selected value (e.g., zeros) and a preservation of the sign code, reducing the use of system resources and improving performance.

Additionally, or alternatively, in one or more embodiments, the selected portion of the source value is a specified number of rightmost digits of the source value. The move operation includes placing the specified number of rightmost digits of the source value into the one part of the output value, and the truncate operation includes setting digits of the another part of the output value to zero. The output value of the result includes the specified number of rightmost digits of the source value and other digits set to zero. A single instruction is able to perform multiple operations including a move operation of a specified number of digits, a truncate operation including setting other digits to zero and a preservation of the sign code, reducing the use of system resources and improving performance.

Additionally, or alternatively, in one or more embodiments, the providing the result includes providing the output value and the result sign code in a target location. The target location includes a target position to include the output value and a target sign position to include the result sign code. By using a single instruction to provide the output value and the result sign code, flexibility and efficiencies are provided in processing of the instruction and processing within the computing environment. The execution of a single instruction to perform one or more operations and to pass-through the sign code saves resources and improves performance.

Additionally, or alternatively, in one or more embodiments, the source location is at least one register and the target location is at least one other register. By using registers to perform the operations, latency is reduced, and performance is improved by avoiding memory stores to perform the operations.

Additionally, or alternatively, in one or more embodiments, the one or more controls of the instruction further include a sign operation control, and the checking the one or more controls of the instruction includes checking the preserve sign control and a sign operation value of the sign operation control to determine that the result sign code is the sign code in the source sign position of the source location unmodified. By using multiple controls of a single instruction to determine the result sign code, flexibility and efficiencies are provided in processing of the instruction and processing within the computing environment. The execution of a single instruction to perform one or more operations and to pass-through the sign code saves resources and improves performance.

Additionally, or alternatively, in one or more embodiments, the sign operation value is a maintain operation. By using multiple controls of a single instruction, including a preserve sign control and a sign operation control having a sign operation value of maintain operation to determine the result sign code, flexibility and efficiencies are provided in processing of the instruction and processing within the computing environment. The execution of a single instruction to perform one or more operations and to pass-through the sign code saves resources and improves performance.

Additionally, or alternatively, in one or more embodiments, the computer operations further include executing another instance of the instruction. Based on executing the another instance of the instruction and the value of the preserve sign control being set to unenabled, the checking the one or more controls of the instruction includes checking a plurality of controls of the instruction to be used in determining the result sign code. By providing a preserve sign control that is unenabled, legacy code may continue to execute and perform as expected. Use of the preserve sign control allows strict compatibility to the behavior of existing compiled code (even in cases where the data being operated on may not adhere to the documented canonical formats) without having to break out of an otherwise efficient instruction sequence using in-register instructions to use a plurality of less optimal general-purpose instructions or have to fall back to even less efficient in-memory instructions. Further, by providing the preserve sign control in the instruction, enhancements may also be observed when the preserve sign control is enabled. This provides flexibility while not affecting legacy code. The execution of a single instruction to perform one or more operations and determine the sign code saves resources and improves performance.

Additionally, or alternatively, in one or more embodiments, the plurality of controls of the instruction includes a sign operation control used to indicate a sign operation value to be used in determining the result sign code, a positive sign code control used to indicate a selected sign code to be used to represent a sign of positive and a negative zero control used to indicate whether a negative zero result is permitted. By providing a preserve sign control that is unenabled, legacy code may continue to execute and perform as expected. Other controls of the instruction, including the sign operation control, the positive sign code control and the negative zero control may behave as expected in legacy applications. This provides flexibility and strict compatibility with legacy code.

In accordance with one or more aspects, each of the embodiments is separable and optional from one another. Further, embodiments may be combined with one another.

In one or more aspects, a computer program product is provided. The computer program product includes a set of one or more computer readable storage media, and program instructions, collectively stored in the set of one or more computer readable storage media, for causing at least one computing device to perform computer operations including executing an instruction to obtain a result of the instruction including an output value and a result sign code. The executing the instruction includes performing at least one operation on at least a portion of a source value to provide the output value of the result. The at least one operation includes a move operation in which a selected portion of the source value is placed in one part of the output value of the result. The source value is located in a source location, and the source location includes a source position to include the source value and a source sign position to include a sign code of the source value. One or more controls of the instruction are checked to be used in determining the result sign code. The one or more controls of the instruction include a preserve sign control. Based on, at least, the value of the preserve sign control being set to enabled, it is determined that the result sign code is the sign code in the source sign position of the source location unmodified. The sign code in the source sign position of the source location, unmodified, is provided as the result sign code. The providing, unmodified, the sign code in the source sign position of the source location as the result sign code includes copying a plurality of digits in the source sign position of the source location as the result sign code. The plurality of digits includes a plurality of binary digits copied from the source sign position of the source location regardless of the sign code and regardless of validity of the sign code. The result including the output value and the result sign code is provided. By providing the sign code of the source value unmodified, an instruction, such as a single architected instruction, is able to pass-through the sign code of the source value to a result without modifying the sign code. This provides efficiencies when pass-through operations are to be performed. The execution of a single instruction to perform at least one operation and to pass-through the sign code saves resources and improves performance. For instance, path length is shortened improving performance. Further, use of the preserve sign control allows for more compact code reducing storage for the program text and more optimal use of scarce instruction cache resources. By copying the plurality of binary digits unmodified and unvalidated, an instruction, such as a single architected instruction, is able to pass-through the sign code of the source value to a result without modifying the sign code. A single instruction is able to perform multiple operations including a move operation and a preservation of the sign code, reducing the use of system resources and improving performance.

In accordance with one or more aspects, each of the embodiments is separable and optional from one another. Further, embodiments may be combined with one another.

In one or more aspects, a computer program product is provided. The computer program product includes a set of one or more computer readable storage media, and program instructions, collectively stored in the set of one or more computer readable storage media, for causing at least one computing device to perform computer operations including executing an instruction to obtain a result of the instruction including an output value and a result sign code. The executing the instruction includes performing at least one operation on at least a portion of a source value to provide the output value of the result. The at least one operation includes a move operation in which a selected portion of the source value is placed in one part of the output value of the result and a truncate operation in which another portion of the source value is missing from the output value and another part of the output value is set to a selected value. The selected portion of the source value is a specified number of rightmost digits of the source value. The move operation includes placing the specified number of rightmost digits of the source value into the one part of the output value, and the truncate operation includes setting digits of the another part of the output value to zero. The output value of the result includes the specified number of rightmost digits of the source value and other digits set to zero. The source value is located in a source location, and the source location includes a source position to include the source value and a source sign position to include a sign code of the source value. One or more controls of the instruction are checked to be used in determining the result sign code. The one or more controls of the instruction include a preserve sign control. Based on, at least, the value of the preserve sign control being set to enabled, it is determined that the result sign code is the sign code in the source sign position of the source location unmodified. The sign code in the source sign position of the source location, unmodified, is provided as the result sign code. The providing, unmodified, the sign code in the source sign position of the source location as the result sign code includes copying a plurality of digits in the source sign position of the source location as the result sign code. The plurality of digits includes a plurality of binary digits copied from the source sign position of the source location regardless of the sign code and regardless of validity of the sign code. The result including the output value and the result sign code is provided. By providing the sign code of the source value unmodified, an instruction, such as a single architected instruction, is able to pass-through the sign code of the source value to a result without modifying the sign code. This provides efficiencies when pass-through operations are to be performed. The execution of a single instruction to perform at least one operation and to pass-through the sign code saves resources and improves performance. For instance, path length is shortened improving performance. Further, use of the preserve sign control allows for more compact code reducing storage for the program text and more optimal use of scarce instruction cache resources. By copying the plurality of binary digits unmodified and unvalidated, an instruction, such as a single architected instruction, is able to pass-through the sign code of the source value to a result without modifying the sign code. A single instruction is able to perform multiple operations including a move operation and a preservation of the sign code, reducing the use of system resources and improving performance.

In accordance with one or more aspects, each of the embodiments is separable and optional from one another. Further, embodiments may be combined with one another.

In one or more aspects, a computer program product is provided. The computer program product includes a set of one or more computer readable storage media, and program instructions, collectively stored in the set of one or more computer readable storage media, for causing at least one computing device to perform computer operations including executing an instruction to obtain a result of the instruction including an output value and a result sign code. The executing the instruction includes performing at least one operation on at least a portion of a source value to provide the output value of the result. The at least one operation includes a move operation in which a selected portion of the source value is placed in one part of the output value of the result and a truncate operation in which another portion of the source value is missing from the output value and another part of the output value is set to a selected value. The selected portion of the source value is a specified number of rightmost digits of the source value. The move operation includes placing the specified number of rightmost digits of the source value into the one part of the output value, and the truncate operation includes setting digits of another part of the output value to zero. The output value of the result includes the specified number of rightmost digits of the source value and other digits set to zero. The source value is located in a source location, and the source location includes a source position to include the source value and a source sign position to include a sign code of the source value. One or more controls of the instruction are checked to be used in determining the result sign code. The one or more controls of the instruction include a preserve sign control and a sign operation control. The checking the one or more controls of the instruction includes checking the preserve sign control and a sign operation value of the sign operation control to determine that the result sign code is the sign code in the source sign position of the source location unmodified. Based on, at least, the value of the preserve sign control being set to enabled, it is determined that the result sign code is the sign code in the source sign position of the source location unmodified. The sign code in the source sign position of the source location, unmodified, is provided as the result sign code. The result including the output value and the result sign code is provided. By providing the sign code of the source value unmodified, an instruction, such as a single architected instruction, is able to pass-through the sign code of the source value to a result without modifying the sign code. This provides efficiencies when pass-through operations are to be performed. The execution of a single instruction to perform at least one operation and to pass-through the sign code saves resources and improves performance. For instance, path length is shortened improving performance. Further, use of the preserve sign control allows for more compact code reducing storage for the program text and more optimal use of scarce instruction cache resources. By copying the plurality of binary digits unmodified and unvalidated, an instruction, such as a single architected instruction, is able to pass-through the sign code of the source value to a result without modifying the sign code. By using multiple controls of a single instruction to determine the result sign code, flexibility and efficiencies are provided in processing of the instruction and processing within the computing environment. The execution of a single instruction to perform one or more operations and to pass-through the sign code saves resources and improves performance. A single instruction is able to perform multiple operations including a move operation and a preservation of the sign code, reducing the use of system resources and improving performance.

In accordance with one or more aspects, each of the embodiments is separable and optional from one another. Further, embodiments may be combined with one another In one or more aspects, a computer system is provided. The computer system includes at least one computing device, a set of one or more computer readable storage media, and program instructions, collectively stored in the set of one or more computer readable storage media, for causing the at least one computing device to perform computer operations including executing an instruction to obtain a result of the instruction including an output value and a result sign code. The executing the instruction includes performing at least one operation on at least a portion of a source value to provide the output value of the result. The source value is located in a source location, and the source location includes a source position to include the source value and a source sign position to include a sign code of the source value. One or more controls of the instruction are checked to be used in determining the result sign code. The one or more controls of the instruction include a preserve sign control. Based on, at least, the value of the preserve sign control being set to enabled, it is determined that the result sign code is the sign code in the source sign position of the source location unmodified. The sign code in the source sign position of the source location, unmodified, is provided as the result sign code. The result including the output value and the result sign code is provided. By providing the sign code of the source value unmodified, an instruction, such as a single architected instruction, is able to pass-through the sign code of the source value to a result without modifying the sign code. This provides efficiencies when pass-through operations are to be performed. The execution of a single instruction to perform one or more operations and to pass-through the sign code saves resources and improves performance. For instance, path length is shortened improving performance. Further, use of the preserve sign control allows for more compact code reducing storage for the program text and more optimal use of scarce instruction cache resources.

Additionally, or alternatively, in one or more embodiments, the at least one operation includes a move operation in which a selected portion of the source value is placed in one part of the output value of the result and a truncate operation in which another portion of the source value is missing from the output value and another part of the output value is set to a selected value. A single instruction is able to perform multiple operations including a move operation, a truncate operation by setting another part of the output value to a selected value (e.g., zeros) and a preservation of the sign code, reducing the use of system resources and improving performance.

Additionally, or alternatively, in one or more embodiments, the providing the result includes providing the output value and the result sign code in a target location. The target location includes a target position to include the output value and a target sign position to include the result sign code. The source location is at least one register and the target location is at least one other register. By using a single instruction to provide the output value and the result sign code, flexibility and efficiencies are provided in processing of the instruction and processing within the computing environment. The execution of a single instruction to perform one or more operations and to pass-through the sign code saves resources and improves performance. By using registers to perform the operations, latency is reduced and performance is improved by avoiding memory stores to perform the operations.

Additionally, or alternatively, in one or more embodiments, the one or more controls of the instruction further include a sign operation control, and the checking the one or more controls of the instruction includes checking the preserve sign control and a sign operation value of the sign operation control to determine that the result sign code is the sign code in the source sign position of the source location unmodified. By using multiple controls of a single instruction to determine the result sign code, flexibility and efficiencies are provided in processing of the instruction and processing within the computing environment. The execution of a single instruction to perform one or more operations and to pass-through the sign code saves resources and improves performance.

In accordance with one or more aspects, each of the embodiments is separable and optional from one another. Further, embodiments may be combined with one another.

In one or more aspects, a computer-implemented method is provided. The computer-implemented method includes executing an instruction to obtain a result of the instruction including an output value and a result sign code. The executing the instruction includes performing at least one operation on at least a portion of a source value to provide the output value of the result. The source value is located in a source location, and the source location includes a source position to include the source value and a source sign position to include a sign code of the source value. One or more controls of the instruction are checked to be used in determining the result sign code. The one or more controls of the instruction include a preserve sign control. Based on, at least, the value of the preserve sign control being set to enabled, it is determined that the result sign code is the sign code in the source sign position of the source location unmodified. The sign code in the source sign position of the source location, unmodified, is provided as the result sign code. The result including the output value and the result sign code is provided. By providing the sign code of the source value unmodified, an instruction, such as a single architected instruction, is able to pass-through the sign code of the source value to a result without modifying the sign code. This provides efficiencies when pass-through operations are to be performed. The execution of a single instruction to perform at least one operation and to pass-through the sign code saves resources and improves performance. For instance, path length is shortened improving performance. Further, use of the preserve sign control allows for more compact code reducing storage for the program text and more optimal use of scarce instruction cache resources.

Additionally, or alternatively, in one or more embodiments, the at least one operation includes a move operation in which a selected portion of the source value is placed in one part of the output value of the result and a truncate operation in which another portion of the source value is missing from the output value and another part of the output value is set to a selected value. A single instruction is able to perform multiple operations including a move operation, a truncate operation by setting another part of the output value to a selected value (e.g., zeros) and a preservation of the sign code, reducing the use of system resources and improving performance.

Additionally, or alternatively, in one or more embodiments, the providing the result includes providing the output value and the result sign code in a target location. The target location includes a target position to include the output value and a target sign position to include the result sign code. The source location is at least one register and the target location is at least one other register. By using a single instruction to provide the output value and the result sign code, flexibility and efficiencies are provided in processing of the instruction and processing within the computing environment. The execution of a single instruction to perform one or more operations and to pass-through the sign code saves resources and improves performance. By using registers to perform the operations, latency is reduced and performance is improved by avoiding memory stores to perform the operations.

Additionally, or alternatively, in one or more embodiments, the one or more controls of the instruction further include a sign operation control, and the checking the one or more controls of the instruction includes checking the preserve sign control and a sign operation value of the sign operation control to determine that the result sign code is the sign code in the source sign position of the source location unmodified. By using multiple controls of a single instruction to determine the result sign code, flexibility and efficiencies are provided in processing of the instruction and processing within the computing environment. The execution of a single instruction to perform one or more operations and to pass-through the sign code saves resources and improves performance.

In accordance with one or more aspects, each of the embodiments is separable and optional from one another. Further, embodiments may be combined with one another.

In one or more aspects, a computer program product is provided. The computer program product includes a set of one or more computer readable storage media, and program instructions, collectively stored in the set of one or more computer readable storage media, for causing at least one computing device to perform computer operations including executing an instruction to perform one or more operations on a source value included in at least one source register specified using one or more fields of the instruction. The source value includes a plurality of digits in a source digits position of the at least one source register and a sign code in a source sign position of the at least one source register. The executing the instruction includes placing a specified number of digits of the plurality of digits in the source digits position of the at least one source register in a target digits position of at least one target register and setting one or more other digits in the target digits position to a selected value. A result sign code to be placed in a target sign position of the at least one target register is determined. The determining includes checking one or more controls of the instruction to be used in determining the result sign code. The one or more controls of the instruction include a preserve sign control, and based on, at least, the value of the preserve sign control being set to enabled, the result sign code placed in the target sign position of the at least one register is the sign code in the source sign position unmodified. An output of the instruction is provided based on execution of the instruction, and the output includes the at least one target register. By providing the sign code of the source value unmodified, an instruction, such as a single architected instruction, is able to pass-through the sign code of the source value to a result without modifying the sign code. This provides efficiencies when pass-through operations are to be performed. The execution of a single instruction to perform one or more operations and to pass-through the sign code saves resources and improves performance. For instance, path length is shortened improving performance. Further, use of the preserve sign control allows for more compact code reducing storage for the program text and more optimal use of scarce instruction cache resources. Further, the use of registers to perform the operations reduces latency and improves performance by avoiding memory stores to perform the operations.

Additionally, or alternatively, in one or more embodiments, the specified number of digits is provided in a control of the instruction. By using a control of the instruction to specify the number of digits to be moved, efficiencies are gained by not relying on memory for the information. This improves processing within the computer application and within the computing environment.

In accordance with one or more aspects, each of the embodiments is separable and optional from one another. Further, embodiments may be combined with one another.

In one or more aspects, a computer program product is provided. The computer program product includes a set of one or more computer readable storage media, and program instructions, collectively stored in the set of one or more computer readable storage media, for causing at least one computing device to perform computer operations including executing an instruction to perform one or more operations on a source value included in at least one source register specified using one or more fields of the instruction. The source value includes a plurality of digits in a source digits position of the at least one source register and a sign code in a source sign position of the at least one source register. The executing the instruction includes placing a specified number of digits of the plurality of digits in the source digits position of the at least one source register in a target digits position of at least one target register and setting one or more other digits in the target digits position to a selected value. A result sign code to be placed in a target sign position of the at least one target register is determined. The determining includes checking one or more controls of the instruction to be used in determining the result sign code to be placed in the target position of the at least one target register. The one or more controls of the instruction include a preserve sign control, and based on the value of the preserve sign control being set to unenabled indicating that the sign code is not being preserved, the checking the one or more controls includes checking a plurality of controls of the instruction to be used in determining the result sign code. An output of the instruction is provided based on execution of the instruction, and the output includes the at least one target register. By providing a preserve sign control that is unenabled, legacy code may continue to execute and perform as expected. However, by providing the preserve sign control in the instruction, enhancements may also be observed when the preserve sign control is enabled. This provides flexibility while not affecting legacy code. The execution of a single instruction to perform one or more operations and determine the sign code saves resources and improves performance. For instance, path length is shortened improving performance. Further, use of the preserve sign control allows for more compact code reducing storage for the program text and more optimal use of scarce instruction cache resources. Further, the use of registers to perform the operations reduces latency and improves performance by avoiding memory stores to perform the operations.

Additionally, or alternatively, in one or more embodiments, the plurality of controls includes a sign operation control used to indicate a sign operation value to be used in determining the result sign code, a positive sign code control used to indicate a selected sign code to be used to represent a sign of positive and a negative zero control used to indicate whether a negative zero result is permitted. By using multiple controls of a single instruction to determine the result sign code, flexibility and efficiencies are provided in processing of the instruction and processing within the computing environment. The execution of a single instruction to perform one or more operations and to pass-through the sign code saves resources and improves performance.

In accordance with one or more aspects, each of the embodiments is separable and optional from one another. Further, embodiments may be combined with one another.

Computer-implemented methods, computer systems and computer program products relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs sign code preservation processing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as an instruction with preserve sign control code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

Figure 2:
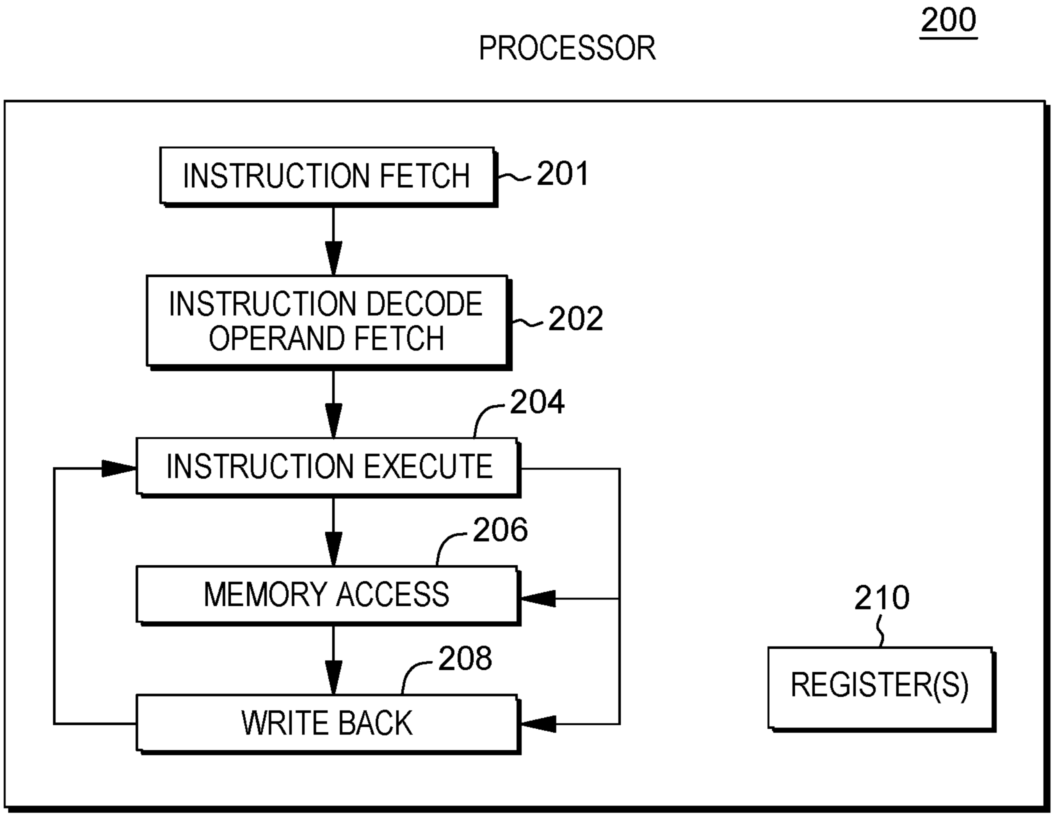
FIG. 2 depicts one example of further details of a processor of the processor set of FIG. 1, in accordance with one or more aspects of the present disclosure.

In one example, a processor (e.g., of processor set 110) includes a plurality of functional components (or a subset thereof) used to execute instructions. As depicted in FIG. 2, in one example, a processor 200 includes, for instance, an instruction fetch component 201 to fetch instructions to be executed; an instruction decode/operand fetch component 202 to decode the fetched instructions and to obtain operands of the decoded instructions; one or more instruction execute components 204 to execute the decoded instructions; a memory access component 206 to access memory for instruction execution, if necessary; and a write back component 208 to provide the results of the executed instructions. One or more of the components may access and/or use one or more registers 210 in instruction processing. Further, one or more of the components may access and/or use instruction with preserve sign control module 150. Additional, fewer and/or other components may be used in one or more aspects of the present disclosure.

In one example, an instruction with preserve sign control module (e.g., instruction with preserve sign control module 150) is used, in accordance with one or more aspects of the present disclosure. An instruction with preserve sign control module (e.g., instruction with preserve sign control module 150) includes code or instructions used to perform one or more operations on data, including, for instance, a move and/or truncate operation on data of a source value, and a preserve sign code of the source value operation, in accordance with one or more aspects of the present disclosure. An instruction with preserve sign control module (e.g., instruction with preserve sign control module 150) includes, in one example, various sub-modules to be used to perform the processing. The sub-modules are, e.g., computer readable program code (e.g., instructions) in computer readable media, e.g., storage (persistent storage 113, cache 121, storage 124, other storage, as examples). The computer readable storage media may be part of one or more computer program products and the computer readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute one or more of the sub-modules and/or portions thereof. Many examples are possible.

Figure 3A:
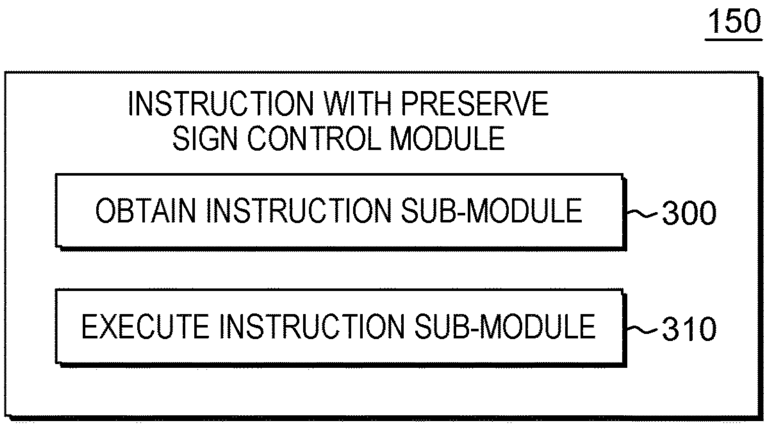
FIG. 3A depicts one example of sub-modules of an instruction with preserve sign control module of FIG. 1, in accordance with one or more aspects of the present disclosure.

One example of instruction with preserve sign control module 150 is described with reference to FIG. 3A. In one example, instruction with preserve sign control module 150 includes an obtain instruction sub-module 300 to obtain (e.g., receive, be provided, pull, retrieve, fetch, etc.) an instruction to be executed, such as a sign operation instruction with sign passthrough, and an execute instruction sub-module 310 to be used to execute the instruction.

Figure 3B:
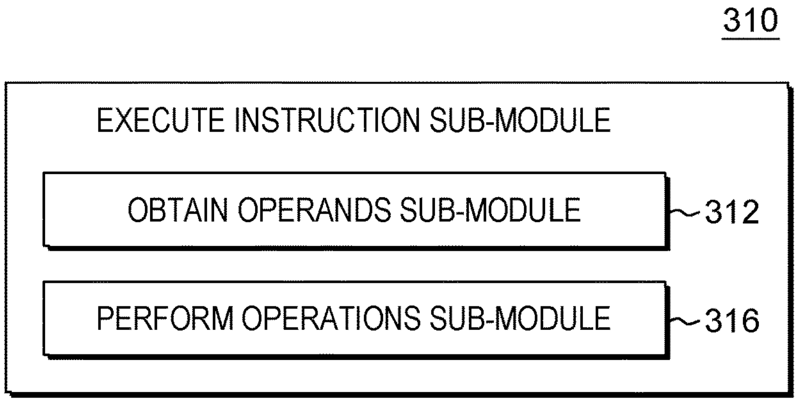
FIG. 3B depicts one example of sub-modules of the execute instruction sub-module of the instruction with preserve sign control module of FIG. 3A, in accordance with one or more aspects of the present disclosure.

In one example, referring to FIG. 3B, execute instruction sub-module 310 includes, for instance, an obtain operands sub-module 312 to obtain one or more operands of the instruction; and a perform operations sub-module 316 to perform one or more operations on data (e.g., move or copy digits, truncate digits, preserve sign code, etc.).

Figure 3C:
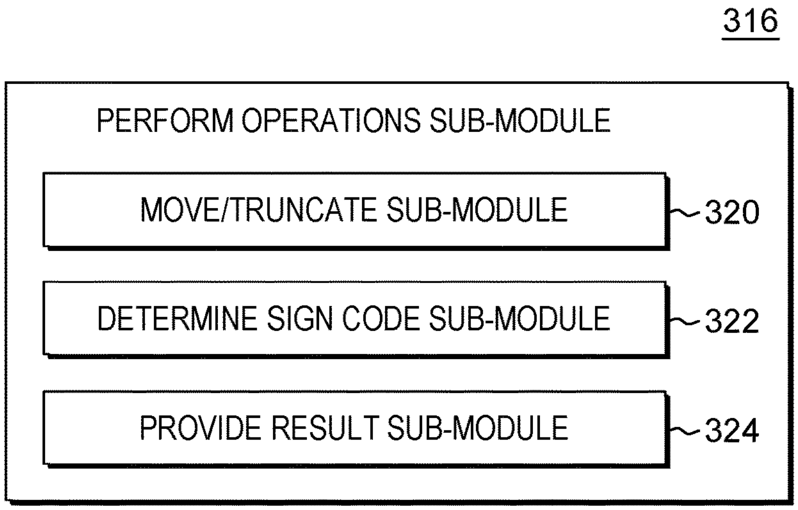
FIG. 3C depicts one example of sub-modules of the perform operations sub-module of the execute instruction sub-module of FIG. 3B, in accordance with one or more aspects of the present disclosure.

Further details of perform operations sub-module 316 are described with reference to FIG. 3C. For example, perform operations sub-module 316 includes a move/truncate sub-module 320 to move or copy and/or truncate one or more digits of a source value, such as a decimal value; a determine sign code sub-module 322 to determine a sign code of a result of the instruction, including preserving the sign code based on a control of the instruction being enabled; and a provide result sub-module 324 to provide a result of the instruction including the determined sign code. In one or more examples, move/truncate includes placing (e.g., moving, copying, etc.) a portion of a source value (e.g., a portion of a decimal number) in a target digits position of a target location (e.g., result, target register, etc.) and truncating another portion of the source value in that it is missing from the target location; instead, a selected value (e.g., zero) is placed in remaining digits of the digit positions of the target location.

In accordance with one or more aspects, an instruction that is obtained and executed is a perform sign operation with sign passthrough instruction. One particular example of a perform sign operation with sign passthrough is a vector perform sign operation decimal instruction, one example of which is described with reference to FIGS. 4A-4E. In one example, a vector perform sign operation decimal instruction, such as a Vector Perform Sign Operation Decimal instruction 400, is a single architected hardware machine instruction at the hardware/software interface. As an example, it is part of an instruction set architecture. One example of an instruction set architecture to incorporate and/or use a vector perform sign operation decimal instruction and/or aspects of the present disclosure is the z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. z/Architecture and IBM are trademarks or registered trademarks of International Business Machines Corporation in at least one jurisdiction.

In one example, the Vector Perform Sign Operation Decimal instruction is part of a vector facility of an instruction set architecture. The vector facility provides, for instance, fixed sized vectors ranging from, e.g., one to sixteen elements. Each vector includes data which is operated on by vector instructions defined in the facility. In one embodiment, if a vector is made up of multiple elements, then each element is processed in parallel with the other elements. Instruction completion does not occur, in one example, until processing of all the elements is complete. In other embodiments, the elements are processed partially in parallel and/or sequentially; and/or there may be additional elements.

In one embodiment, the vector instructions use vector registers that include the vectors. For instance, each vector register is, e.g., 128 bits in length and includes one to sixteen equal sized elements. If there are multiple elements in the register, the elements are indexed from left to right starting with element zero. In one example, the vector facility includes 32 vector registers, which are part of a register file. The register file is an array of processor registers in, e.g., a central processing unit (e.g., a processor of processor set 110; e.g., processor 200) that includes registers that may be used for instruction processing. In one example, the register file includes the vector registers (e.g., 32 vector registers) and other types of registers can map to a quadrant of the vector registers. For instance, sixteen floating point registers, which are 64 bits in length, can overlay the vector registers. Thus, as an example, when floating point register 2 is modified, then vector register 2 is also modified. Other mappings for other types of registers are also possible.

Vector data appears in storage in, for instance, a left-to-right sequence, similar to other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

Figure 4A:
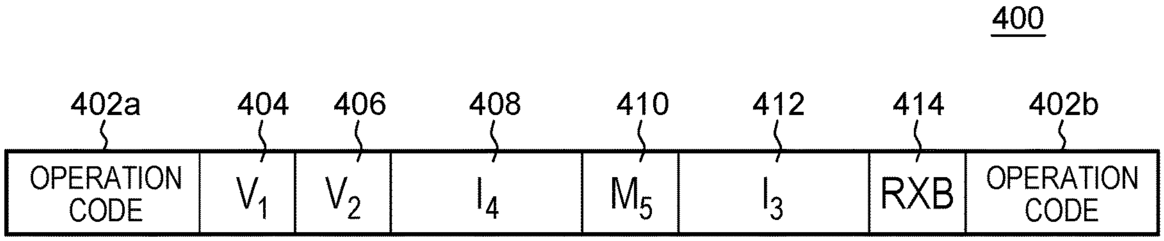
FIG. 4A depicts one example of a format of a Vector Perform Sign Operation Decimal instruction, in accordance with one or more aspects of the present disclosure.
Figure 4B:
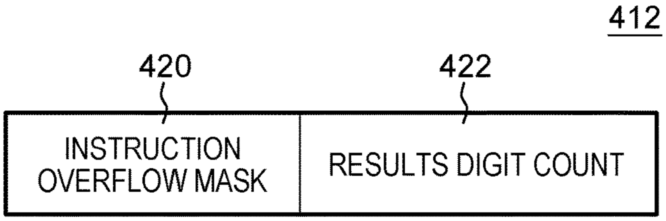
FIG. 4B depicts one example of controls of an immediate operand of the Vector Perform Sign Operation Decimal instruction of FIG. 4A, in accordance with one or more aspects of the present disclosure.

Continuing with FIG. 4A, in one particular example, Vector Perform Sign Operation Decimal instruction 400 has a vector register and immediate operand operation with an extended opcode format. Vector Perform Sign Operation Decimal instruction 400 includes a plurality of fields, including one or more operation code (opcode) fields 402*a* (e.g., bits 0-7), 402*b* (e.g., bits 40-47) that indicate that this is a vector perform sign operation decimal operation; a first operand field ($V_1$) 404 (e.g., bits 8-11) used to designate a first operand location (e.g., one or more vector registers); a second operand field ($V_2$) 406 (e.g., bits 12-15) used to designate a second operand location (e.g., one or more vector registers); an immediate field ($I_4$) 408 (e.g., bits 16-23) including one or more controls used during execution of the instruction; a mask field ($M_5$) 410 (e.g., bits 24-27) that may be used during execution of the instruction; another immediate field ($I_3$) 412 (e.g., bits 28-35) including one or more controls used during execution of the instruction; and a register extension bit (RXB) field 414 (e.g., bits 36-39) to be used, in one example, with a vector register designated operand field (e.g., $V_1$, $V_2$) to designate a source location and/or a target location (e.g., vector register(s)) used by the instruction, as described below.

In one example, register extension bit (RXB) field 414 includes the most significant bit for a vector register designated operand. Bits for register designations not specified by the instruction are to be reserved and set to zero. The most significant bit is concatenated, for instance, to the left of a four-bit register designation of the vector register field (e.g., $V_1$, $V_2$) to create a five-bit vector register designation.

In one example, the RXB field includes four bits (e.g., bits 0-3), and the bits are defined, as follows:

0—Most significant bit for the vector register designation in, e.g., bits 8-11 of the instruction, if any.

1—Most significant bit for the vector register designation in, e.g., bits 12-15 of the instruction, if any.

2—Most significant bit for the vector register designation in, e.g., bits 16-19 of the instruction, if any.

3—Most significant bit for the vector register designation in, e.g., bits 32-35 of the instruction, if any.

Each bit is set to zero or one by, for instance, the assembler depending on the register number. For instance, for registers 0-15, the bit is set to 0; for registers 16-31, the bit is set to 1, etc. Thus, a register containing an operand is specified using, for instance, a four-bit field of the register field with the addition of its corresponding register extension bit (RXB) as the most significant bit. For instance, if the four-bit field is 0110 and the extension bit is 0, then the five bit field 00110 indicates register number 6. In a further embodiment, the RXB field includes additional bits, and more than one bit is used as an extension for each vector or location. Further, in other embodiments, the assignment of RXB bits to operands and/or bits of the instruction format may be different than the examples herein. Other variations are possible.

Although in this example there are a plurality of opcode fields 402*a*, 402*b*, in other examples, there may be one opcode field. For instance, there may be one opcode field at the beginning of the instruction format. Other examples are also possible. Further, one or more fields of a vector perform sign operation decimal instruction, such as Vector Perform Sign Operation Decimal instruction 400, may be optional. As an example, RXB field 414 may be optional. For instance, a vector perform sign operation decimal instruction, such as Vector Perform Sign Operation Decimal instruction 400, may not have an RXB field. Instead, each vector register designated operand field includes an indication of the vector register. Many variations are possible.

Further details relating to one or more of the fields of the instruction are described below. For example, immediate field ($I_3$) 412 includes the third operand of the instruction, and referring to FIG. 4B, includes, in one example:

An instruction overflow mask 420 (e.g., bit 0): In one example, when, e.g., a vector-packed-decimal-enhancement facility 1 is not installed, instruction overflow mask 420 is reserved and is to contain, e.g., zero; otherwise, a specification exception is recognized, in one example. When, e.g., the vector-packed-decimal-enhancement facility 1 is installed, bit 0 is an instruction overflow mask. When instruction overflow mask 420 is, e.g., one, recognition of a decimal overflow program interrupt is suppressed, in one example. Other examples and/or variations are possible.

In one example, bits 1-2 of intermediate field 412 are reserved and are to contain zeros. Otherwise, a specification exception may be recognized, in one example.

Results digit count 422 (e.g., bits 3-7): In one example, results digit count 422 contains an unsigned binary integer specifying, e.g., the number of rightmost digits of the second operand (also referred to herein as a source value) to be placed in the first operand (also referred to herein as an output value). If the magnitude of the second operand is, e.g., larger than the largest decimal number that can be represented with the specified number of digits, decimal overflow occurs, and if a decimal overflow mask (e.g., in a status register, such as a program status word or other status location) is, e.g., one, a program interruption for decimal overflow occurs, in one example. If the results digit count 422 field is, e.g., zero, a specification exception is recognized, in one example. Other examples and/or variations are possible.

Figure 4C:
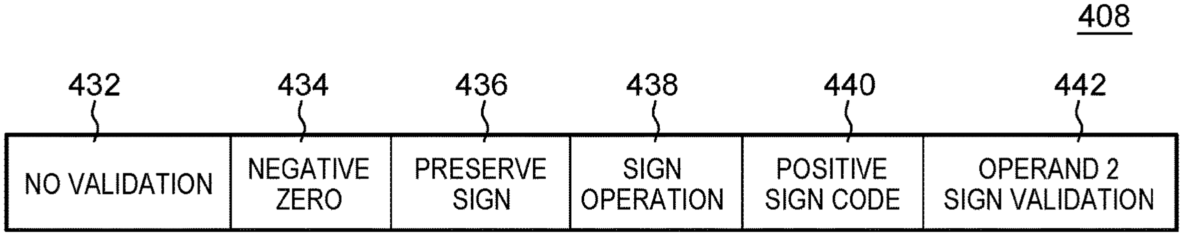
FIG. 4C depicts one example of controls of another immediate operand of the Vector Perform Sign Operation Decimal instruction of FIG. 4A, in accordance with one or more aspects of the present disclosure.

Further, in one example, immediate field ($I_4$) 408 includes the fourth operand of the instruction, and referring to FIG. 4C includes, for instance, a plurality of controls including, as examples, a no validation 432 control, a negative zero 434 control, a preserve sign 436 control, a sign operation 438 control, a positive sign code 440 control, and an operand 2 sign validation 442 control. Each control is further described below.

No Validation 432 (e.g., bit 0): In one example, when no validation 432 is, e.g., zero or, in one example, the vector-packed-decimal-enhancement facility 1 is not installed, the second operand digits (e.g., the digits in the vector register(s) specified using $V_2$ 406) are checked for validity; if sign operation 438 control specifies maintain sign, then the second operand sign code is also checked for validity. Sign code validity is checked when sign operation 438 control specifies complement sign and dependent on operand 2 sign validation 442 control if sign operation 438 control specifies force positive or force negative. If the validity check fails, a data exception is recognized. If no validation 432 is, e.g., one and, e.g., the vector-packed-decimal-enhancement facility 1 is installed, then the second operand digits are not checked for validity; and if sign operation 438 control specifies maintain sign, then the second operand sign code is also not checked. Other examples and/or variations are possible.

Negative Zero 434 (e.g., bit 1): In one example, when, e.g., the vector-packed-decimal-enhancement facility 1 is installed and negative zero 434 is, e.g., one, the program specifies a negative zero result is permitted; otherwise, the sign for a zero result will be positive, in one example. When the magnitude of the result is, e.g., zero, the result sign is a function of the sign code of the second operand, sign operation 438, positive sign code 440, negative zero 434 and preserve sign 436 controls, as specified in FIG. 4E. Other examples and/or variations are possible.

In one example, bit 2 is ignored but is to contain, e.g., zeros; otherwise, the program may not operate compatibly in the future.

Preserve Sign 436 (e.g., bit 3): In one example, when, e.g., the vector-packed-decimal-enhancement facility 3 is installed, the operation specified by sign operation 438 control is maintain, and preserve sign 436 is, e.g., one, the sign code of the second operand is placed unmodified into the sign position of the first operand, regardless of the values specified in positive sign code 440 and negative zero 434 controls. When, e.g., the vector-packed-decimal-enhancement facility 3 is not installed, the value of sign operation 438 field is, e.g., nonzero, or preserve sign 436 is, e.g., zero, the sign code placed in the first operand is a function of the sign code of the second operand, result magnitude, sign operation 438, positive sign code 440 and negative zero 434 controls. Other examples and/or variations are possible.

Sign Operation 438 (e.g., bits 4-5): In one example, sign operation 438 specifies the sign operation used in determining the result sign code. The result sign code is a function of, e.g., sign operation 438 control, the second operand sign, the second operand digits, results digit count 422 control, positive sign code 440, negative zero 434 and preserve sign 436, as specified in FIG. 4E. Other examples and/or variations are possible.

Positive Sign Code 440 (e.g., bit 6): In one example, positive sign code 440 applies when the result sign is generated by means other than directly placing the sign code of the second operand into the result. That is, positive sign code 440 applies when sign operation 438 is, e.g., nonzero or when preserve sign 436 is, e.g., zero and the sign code of the second operand is valid. When positive sign code 440 applies and is, e.g., one, sign code 1111 is used for a positive result. When positive sign code 440 applies and is, e.g., zero, sign code 1100 is used for a positive result. Other examples and/or variations are possible.

Operand 2 Sign Validation 442 (e.g., bit 7): In one example, if operand 2 sign validation 442 is, e.g., one and sign operation 438 control specifies force positive or force negative, then the second operand sign code is checked for validity. If operand 2 sign validation 442 is, e.g., zero and sign operation 438 control specifies force positive or force negative, then the second operand sign code is not checked for validity. When sign operation 438 control specifies maintain or complement sign, the second operand sign code is checked for validity, based on the no validation 432 bit value. If the validity check fails, a data exception is recognized. Other examples and/or variations are possible.

Figure 4D:
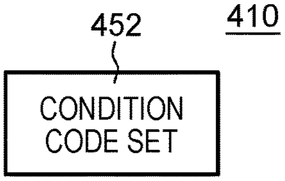
FIG. 4D depicts one example of controls of a mask operand of the Vector Perform Sign Operation Decimal instruction of FIG. 4A, in accordance with one or more aspects of the present disclosure.

Referring to FIG. 4D, in one example, mask field ($M_5$) 410 includes a condition code set (CS) 452 control (e.g., bit 3). In one example, when condition code set 452 is, e.g., zero, the condition code is not set and remains unchanged. When condition code set 452 is, e.g., one, the condition code is set as specified in the resulting condition code, as indicated below. Bits 0-2 of mask field 410 are ignored but are to contain, e.g., zeros, in one example; otherwise the program may not operate compatibly in the future. Other examples and/or variations are possible.

In one example, when condition code set 452 is, e.g., one, the condition code is set as follows: 0—Result zero, no overflow; 1—Result less than zero, no overflow; 2—Result greater than zero, or nonzero result and invalid sign code, no overflow; 3—Overflow. In one example, when condition code set 452 is, e.g., zero, the condition code remains unchanged. Other examples are possible. Other examples and/or variations are possible.

Example program exceptions that may occur during execution of the instruction include data with DXC (data exception code) FE, vector instruction; data with DXC (data exception code) 00, general operand; decimal overflow; operation (if, e.g., the vector packed decimal facility for z/Architecture is not installed); specification; transaction constraint. Additional, fewer and/or other program exceptions may occur in other embodiments and/or for other architectures.

Although in the above examples reference is made as to whether a vector-packed-decimal-enhancement facility is installed, in other examples, such a reference or check is not made. Many examples are possible.

In execution of Vector Perform Sign Operation Decimal instruction 400, in one example, a sign (e.g., a preserved, maintained or modified sign) and a specified number of, e.g., rightmost digits of the second operand are placed in the first operand location (e.g., one or more registers specified using $V_1$) with other digits set to, e.g., zero. The second operand and result are in the signed-packed-decimal format, in one example.

Digit codes (e.g., all digit codes) of the second operand are checked for validity, unless operand 2 no validation 442 control is, e.g., one. The sign code of the second operand is checked for validity based on sign operation 438 control, operand 2 sign validation 442 control and operand 2 no validation 432 control, as specified in FIG. 4E; however, in one example, if preserve sign 436 is enabled (e.g., set to one) and sign operation 438 indicates, e.g., a maintain operation, then validity checking of the sign code is not performed; instead, it is bypassed.

FIG. 4E depicts, for instance, a table showing operation(s) of a sign operation instruction, such as Vector Perform Sign Operation Decimal instruction 400. The table includes the following columns: Sign Operation 460, Result Magnitude (after results digit count 422 is applied) 462, $V_2$ sign 464, Preserve Sign 466, Positive Sign Code 468, Negative Zero 470, $V_2$ Sign Code Validity Check 472, $V_2$ Digit Code Validity Check perform if . . . 474, Result Sign Code (hex) 476 and Condition Code 478.

In one example, the result sign code is a function of one or more controls including, for instance: sign operation 438, the second operand sign, the second operand digits, result digits count 422, preserve sign 436, positive sign code 440 control, and negative zero 434 control, as specified in FIG. 4E, as one example.

In FIG. 4E, as an example, '-' indicates that the results do not depend on this value; 'a' indicates that a result magnitude is considered nonzero if any bits of the result are nonzero; 'b' indicates sign codes 0-9 are considered invalid; 'c' indicates that this produces a suppressing data exception; CC is a resulting condition code when condition code set 452 is, e.g., one; and 'd' indicates that the table is showing the condition code for the non-overflow case—the overflow case delivers, e.g., a condition code 3 (CC3). Other examples and variations are possible.

If the results digit count control does not specify enough digits to contain, e.g., all leftmost nonzero digits of the second operand, decimal overflow occurs. The operation is completed. The result is obtained by ignoring the overflow digits, and if condition code set 452 flag is, e.g., one, condition code, e.g., 3 is set. If the decimal overflow mask in, e.g., the program status word is, e.g., one and instruction overflow mask 420 is, e.g., zero, a program interruption for decimal overflow occurs, in one example.

In one example, if results digit count 422 control specifies less than thirty-one digits, zeros, as an example, are placed in the remaining leftmost digits of the first operand. Other examples and variations are possible.

In the description herein of a vector perform sign operation decimal instruction, such as Vector Perform Sign Operation Decimal instruction 400, specific locations, specific fields and/or specific sizes of the fields may be indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

In one embodiment, the fields of the instruction are separate and independent from one another; however, in other embodiments, more than one field may be combined. Further, although example types of registers are specified for the source field (e.g., $V_2$) and the target field (e.g., $V_1$), other types of registers may be used. For instance, the source field and/or the target field, in other embodiments, may specify other than vector registers. Other examples are possible.

A vector perform sign operation decimal instruction, such as Vector Perform Sign Operation Decimal instruction 400, may have additional, fewer and/or other fields. Further, although various examples are provided for one or more formats of the instruction, additional and/or other formats may be used. Further, the processing may be used for other purposes than described herein.

One embodiment of using a vector perform sign operation decimal instruction (e.g., Vector Perform Sign Operation Decimal instruction 400) to perform sign operation with sign passthrough processing is further described with reference to FIGS. 5A-5B. In one example, a perform sign operation instruction process 500 uses one or more of the sub-modules (e.g., sub-modules 300, 310-316, 320-324) to perform the processing and the process is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

Figure 5A:
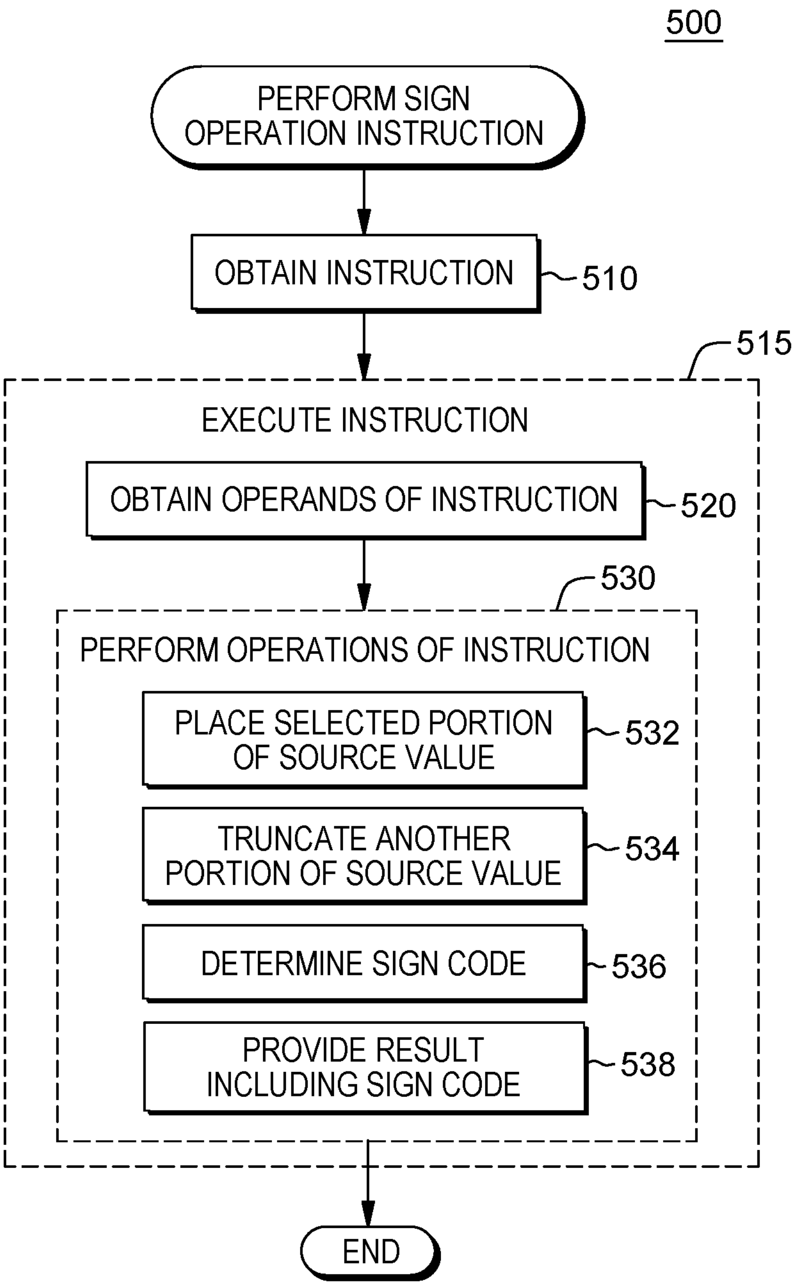
FIG. 5A depicts one example of perform sign operation instruction processing, in accordance with one or more aspects of the present disclosure.

Referring to FIG. 5A, in one example, perform sign operation instruction process 500 (also referred to as process 500) obtains 510 (e.g., receives, retrieves, fetches, is provided, pulls, etc.) an instruction (e.g., a vector perform sign operation decimal instruction) using, e.g., obtain instruction sub-module 300, and executes 515 the instruction using, e.g., execute instruction sub-module 310. Execution of the vector perform sign operation decimal instruction (e.g., Vector Perform Sign Operation Decimal instruction 400) includes, for instance, obtaining 520 one or more operands and/or information of the instruction (e.g., using obtain operands sub-module 312). As examples, process 500 obtains a source value (e.g., a decimal number in a signed-packed decimal format) from a second operand location (e.g., one or more vector registers specified using $V_2$ 406 and RXB 414), and one or more controls from one or more operands of the instruction (e.g., the third, fourth and fifth operands obtained from $I_3$ 412, $I_4$ 408 and $M_5$ 410, respectively). Further, in one or more embodiments, additional, fewer and/or other operands and/or information may be obtained and/or used. The operands and/or information to be obtained depend, for instance, on which operands and/or information are specified using the instruction and/or are being used. For one or more instructions, one or more operands and/or information may be optional and may not be used in various embodiments. Many variations are possible.

Based on obtaining the operands, in one example, process 500 performs 530 a plurality of operations of the instruction (e.g., using perform operations sub-module 316). As an example, process 500 places 532 (e.g., moves or copies) a selected portion of the source value to a selected location (e.g., a target register), using, for instance, move/truncate sub-module 320. In one example, one or more digits of the source value are placed in (e.g., moved or copied from a source position of a source register specified using one or more fields of the instruction to) a target position of a target register specified using one or more fields of the instruction. In one particular example, a specified number of rightmost digits of the second operand (e.g., a source value, such as a number in the signed packed decimal format located in at least one register (e.g., at least one source register) specified using one or more fields of the instruction (e.g., $V_2$ and RXB)) are placed in the first operand location (e.g., at least one register specified using one or more fields of the instruction (e.g., $V_1$ and RXB)), which is referred to herein as the target register. In one example, the specified number of rightmost digits in the source position of the source register are moved or copied to the target position of the target register.

Further, in one example, process 500 truncates 534 (e.g., using move/truncate sub-module 320) another portion of the source value (i.e., it is not included in the target register). For instance, process 500 sets the remaining digits (i.e., digit positions) in the first operand to, e.g., zero, which, in effect, truncates one or more digits of the source value (e.g., the digits that are not placed). In one example, the remaining digit positions of the target position are set to zero. Thus, the first operand location (also referred to as the target register(s)) includes the output value, which is part of a result of executing the instruction.

Another part of the result of executing the instruction is a sign code. Therefore, in accordance with one or more aspects, process 500 determines 536 (e.g., using determine sign code sub-module 322) a sign code for the result. In one example, to determine the sign code one or more controls of the instruction are employed, as described in further detail below with respect to FIG. 5B. The determined sign code is included, e.g., in the first operand location as part of the result of executing the instruction.

Process 500 provides 538 the result including the sign code. For instance, the result is in the first operand location (e.g., one or more vector registers specified using $V_1$ 404 and RXB 414). The result may be used in further processing, such as in computations, data conversions, etc. performed by other instructions or code of computer applications.

Further details relating to determining the sign code are described with reference to FIG. 5B. In one example, a determine sign code process 540 uses one or more of the sub-modules (e.g., sub-module 322) to perform the processing and the process is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

Figure 5B:
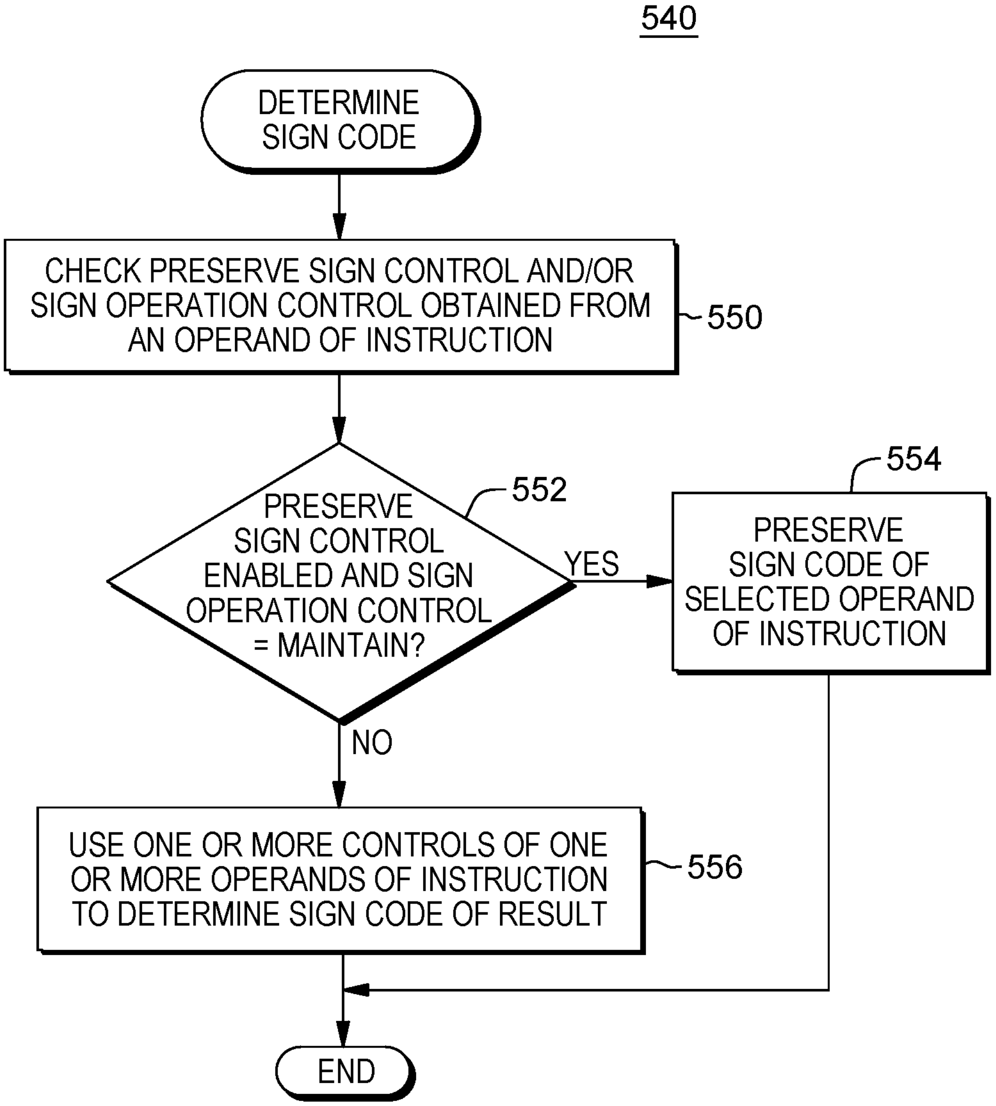
FIG. 5B depicts one example of determine sign code processing, in accordance with one or more aspects of the present disclosure.

In one example, referring to FIG. 5B, a determine sign code process 540 (also referred to as process 540) checks 550 one or more controls of the instruction to determine the sign code of the result. For instance, based on, at least, the value of the preserve sign control (e.g., preserve sign 436) being set to enabled, the result sign code is the sign code in the source sign position of the source location unmodified. In one particular example, process 540 checks 550 a preserve sign control (e.g., preserve sign 436) and/or a sign operation control (e.g., sign operation 438) obtained from an operand (e.g., ($I_4$)) of the instruction. Based on (552) the preserve sign control being enabled (e.g., set to a selected value, such as 1) and the sign operation control being set to a selected sign operation, such as maintain, process 540 preserves 554 the sign code of the selected operand (e.g., the second operand (i.e., the source value)) of the instruction. That is, process 540 provides the sign code of the source value, unmodified (and not checked for validity), as the sign code of the result. This sign code is, for instance, placed in the target sign position of the target location, as described herein.

However, in one example, based on (552) the preserve sign control being unenabled (e.g., set to another selected value, such as 0) or the sign operation control being set to an operation other than maintain (such as, complement, force positive, force negative, etc.), then, in one embodiment, process 540 uses one or more controls of one or more operands of the instruction to determine the sign code of the result, as described herein and as shown in FIG. 4E. For instance, the result sign code is a function of, e.g., sign operation 438 control, the second operand sign, the second operand digits, results digit count 422 control, positive sign code 440, negative zero 434 and preserve sign 436, as specified in FIG. 4E. Other examples and/or variations are possible. This determined sign code is, for instance, placed in the target sign position of the target location, as described herein.

Further, in one or more aspects, if the sign code is not being preserved, then the sign code of the second operand may be checked for validity based on, e.g., sign operation 438 control, operand 2 sign validation 442 control and operand 2 no validation 432 control, as specified in FIG. 4E. This validity checking is not performed, in one example, when the sign code is being preserved.

Process 540 or process 500 provides the resulting sign code in the target sign position of the target location, as described herein.

Described above is an enhanced vector perform sign operation decimal instruction that places data, truncates data and preserves a sign code as part of execution of the enhanced vector perform sign operation decimal instruction.

In one or more aspects, a single architected instruction (e.g., a vector perform sign operation decimal instruction) replaces multiple in-memory instructions that place (e.g., move or copy) and truncate digits and/or a plurality of general vector instructions to place (e.g., move or copy) and truncate data. As one specific example, the following vector perform sign operation decimal instruction is used to place (e.g., move or copy) and truncate 31 digits to 26 digits.

VPSOP V26, V27, 26, SO=0, NV=1, PS=1
→Vector Perform Sign Operation Decimal setting PS=1 and NV=1

It may be used with the following code snippet, in one example:

VLRL V27, 375(R13), 15→Vector Load Rightmost with Length of 16 bytes
VPSOP V26, V27, 26, SO=0, NV=1, PS=1
→Vector Perform Sign Operation Decimal setting PS=1 and NV=1
VSTRL V26, 688(R8), 13→Vector Store Rightmost with Length of 14 bytes In one example, by setting the preserve sign (PS) equal to, e.g., 1 and sign operation (SO) equal to, e.g., 0, the sign code in the source sign position is passed through (without modification, validity checking, etc.) to the target sign position. Thus, in one execution of a single architected instruction, a plurality of operations is performed including, e.g., place, truncate and preserve sign code.

The above architected instruction (e.g., VPSOP-Vector Perform Sign Operation Decimal instruction) may be used to replace the following set of code, which uses instructions operating on in-memory operands to place and truncate 31 digits to 26 digits:

MVC 688(14,R8), 377(R13)→Move Character instruction of 14 bytes
NI 689(R8), 0x0F→AND instruction Further, in another example, the above architected instruction (e.g., VPSOP-Vector Perform Sign Operation Decimal instruction) may be used to replace the following VGBM, VLEIB and VN instructions. In one example, the following set of code, which uses general purpose vector instructions to place and truncate 31 digits to 26 digits, is replaced by the above code snippet that includes, e.g., VLRL, VPSOP and VSTRL:

VLRL V26, 375(R13), 15→Vector Load Rightmost with Length of 16 bytes
VGBM V27, 0x3fff→Vector Generate Byte Mask instruction
VLEIB V27, 0x0f, 2→Vector Load Element Immediate instruction
VN V26, V26, V27→Vector AND instruction
VSTRL V26, 688(R8), 13→Vector Store Rightmost with Length of 14 bytes The use of the single architected instruction to place and truncate data, as well as preserve the sign, reduces the use of resources, avoids latency since memory is not used for the operations and improves performance. The use of the single architected instruction allows the moving or copying of data, clearing of digit positions and the preserving of the sign code for legacy compatibility and improved performance. This avoids breaking consistent use of the vector packed decimal facility (and/or similar facilities of other architectures) by a compiler (such as the COBOL compiler) and/or a binary translator or binary optimizer when move or copy and truncate is to be performed, reducing code bloat and performance slowdowns. The code (e.g., of a computer application) is smaller than with previous move or copy and truncate sequences of instructions, and performance is faster.

In one or more aspects, the use of the Vector Perform Sign Operation Decimal instruction to perform the place, truncate and preserve sign code operations, as part of one architected instruction, enhances the vector packed decimal facility (and/or similar facilities of other architectures) to enable strict compatibility and improved performance when translating legacy code that uses, for instance, in-memory MVC and NI instructions.

Further, in one or more aspects, existing code is not impacted by the use of the Vector Perform Sign Operation Decimal instruction that provides sign code preservation, since the preserve sign code capability may be unenabled (e.g., set preserve sign 436 to, e.g., zero).

In one or more aspects, the preserve sign control and/or preserve sign processing may be used with processing other than move or copy/truncate. For example, the preserve sign control and/or preserve sign processing may be used with a move or copy/widening operation in which the target location is larger than the source location. This may arise, for instance, when an instruction that validates the sign and digit fields, such as a Zero and Add Packed (ZAP) instruction, either performs a move operation (e.g., place, such as move or copy), or a move and widen operation (adds leftmost zero bytes/digits) and then either the original source is moved, or an additional instruction (such as a Move Numerics instruction) moves back the original source sign code. In such a situation, an enhanced Vector Perform Sign Operation Decimal instruction (or similar instruction, other instruction) may be used to preserve the original sign and move or copy the data as desired.

Thus, in one example, the following VPSOP instruction and code sequence:

VLRL V25, 200(R13), 2→Vector Load Rightmost with Length of 3 bytes

VPSOP V24, V25, 25, SO=0, NV=0, PS=1

→Vector Perform Sign Operation Decimal setting PS=1 and NV=0

→NV is no validation and setting to 0 indicates that data

→validation is performed on the source data

VSTRL V24, 582(R8), 12→Vector Store Rightmost with Length of 13 bytes may replace the following in-memory instruction sequence:

ZAP 400(3,R13), 200(3,R13)

→Zero and Add Packed to copy and validate data (3 bytes) to some location

→ZAP copies decimal data from source on the right to target on the left but also →validates that the digits and sign are valid

MVC 592(3,R8), 200(3,R13)

→Move Character to copy original source to new target location (3 bytes)

XC 582(10,R8), 582(10,R8)→Exclusive OR to zero upper 10 bytes at

→the target location

For the above, a binary optimizer may be able to determine that the write by the ZAP to R13+400 for 3 bytes is not required but the validation side-effect (e.g., the validation of the sign and digits of the ZAP source operand) is still to be maintained in the new generated code and this may be accomplished by the all-in-one Vector Perform Sign Operation Decimal instruction.

Further, the above VPSOP instruction and code sequence may replace the following general purpose vector instruction sequence:

VLRL V25, 200(R13), 2→Vector Load Rightmost with length of 3 bytes

. . . →Possible additional vector instructions operating on the data

VPSOP V23, V25, NV=0→Vector Perform Sign Operation Decimal

→setting NV=0 but before preserve sign is available so sign may be altered

VLR V24, V25→Vector Load Register (no data validation)

. . . →Possible additional vector instructions operating on the data

VSTRL V24, 582(R8), 12→Vector Store Rightmost with Length of 13 bytes

In one example, the VLR moves the data without altering any of it and without performing data validation. Thus, extra compensating instructions are used to be equivalent to the original in-memory sequence. The VLR is used, for instance, to move data to satisfy particular register conventions (e.g., as part of an application binary interface (ABI)) or if there are additional in-register operations to be performed between, e.g., the VLRL and VSTRL. Other examples are possible.

With the general purpose vector instruction sequence, separate instructions are used to perform data validation and sign preservation. However, in accordance with an aspect of the present disclosure, one instruction, the enhanced Vector Perform Sign Operation Decimal instruction that includes the preserve sign control, is able to perform data validation and sign preservation (and/or other aspects, operations, features, etc.).

The preserve sign control and/or preserve sign processing may be used with other operations including, for instance, a move or copy operation in which the target location is the same size as the source location and/or any other operations in which the sign code is to be preserved. Move/truncate, move/widening, move operations are just example operations in which it may be desired to preserve a sign code; other operations may use the preserve sign code and/or preserve sign processing.

In one or more aspects, the preserve sign control of the Vector Perform Sign Operation Decimal instruction (or other instruction) may be used with one or more features of the Vector Perform Sign Operation Decimal instruction (or other instruction) to achieve the smallest and most efficient instruction that is also strictly compatible to original or previous code sequences. Although examples are provided herein, other combinations of the preserve sign control and feature(s) of the instruction may be implemented and/or used. Many examples are possible.

Further, instructions other than the vector perform sign operation decimal instruction may include and use the preserve sign control and/or preserve sign processing. Moreover, the source values may be other than decimal values and/or other than decimal values in a signed packed decimal format. Many examples are possible.

In one or more aspects, a computer program product (computer system and/or computer-implemented method) for facilitating processing within a computing environment is provided. The computer program product includes a computer readable storage medium readable by a processing circuit and storing instructions for performing computer operations including obtaining an instruction to perform one or more operations using an input value. The instruction includes a preserve sign control indicator indicating whether the sign of an operand of the instruction is not modified when enabled (e.g., set to 1). The instruction is executed and the executing includes performing the one or more operations using the input value to obtain a result, in which the one or more operations include obtaining a portion of the input value to move into a location as an output of execution of the instruction, the portion of the input value including numerical values and a sign associated with those numerical values, and the result includes the obtained portion of the input value, in which the sign of the obtained portion of the input value is a sign of the result. The executing further includes determining whether the preserve sign control indicator is enabled, and performing further processing, based on the preserve sign control indicator being enabled, in which the sign of the input value is not modified when stored as the sign of the result of the operations performed when executing the instruction.

In one or more aspects, the executing further includes determining whether a sign operation code indicator is enabled (e.g., SO=00), and determining whether a no validation indicator is enabled.

In one or more aspects, the executing further includes ignoring a negative zero control indicator and ignoring a positive sign code indicator.

Other variations and embodiments are possible.

Figure 6A:
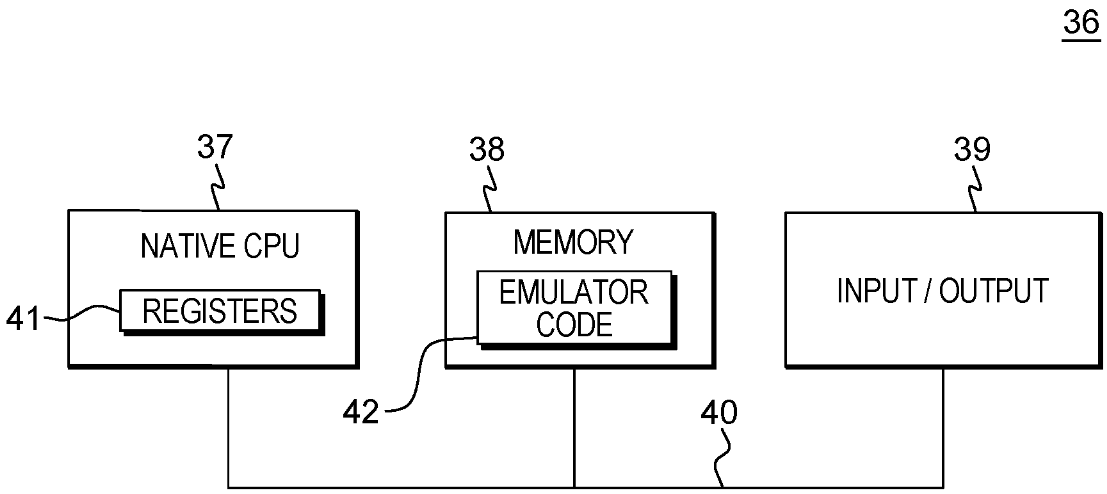
FIGS. 6A-6B depict another example of a computing environment to incorporate and use one or more aspects of the present disclosure.
Figure 6B:
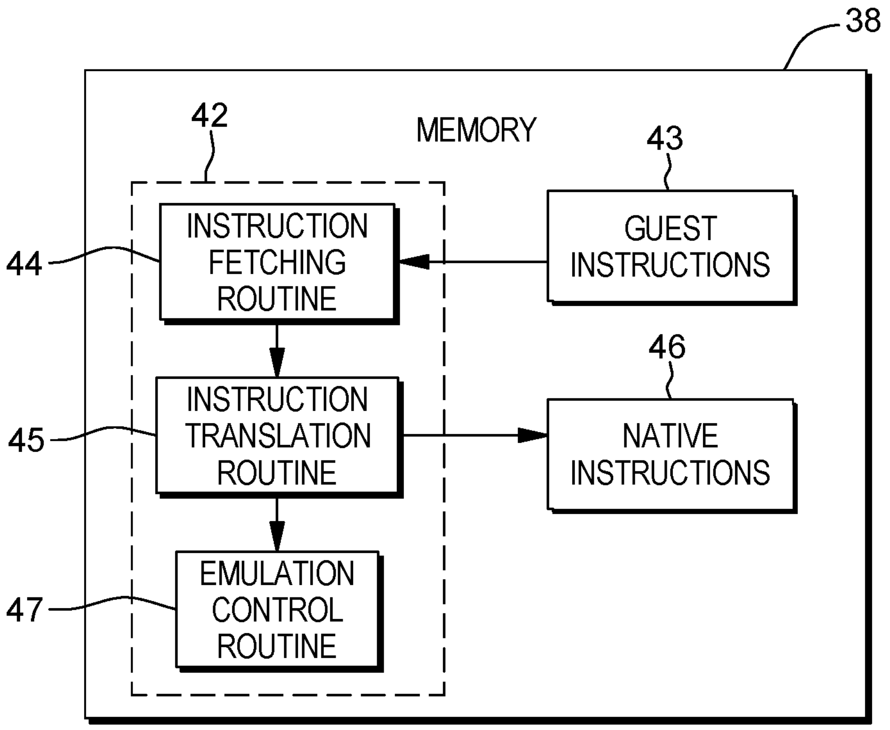

Further, although one or more examples of a computing environment to incorporate and use one or more aspects of the present disclosure are described herein, FIGS. 6A-6B depict another embodiment of a computing environment to incorporate and use one or more aspects of the present disclosure.

Referring, initially, to FIG. 6A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 6B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native CPU 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An example instruction that may be emulated is the vector perform sign operation decimal instruction described herein, in accordance with one or more aspects of the present disclosure.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to implement sign operation processing; place (e.g., move or copy), truncate and preserve sign code processing; and/or perform one or more other aspects of the present disclosure.

One or more aspects of the present disclosure are tied to computer technology and facilitate processing within a computer, improving performance thereof. For instance, processing speed is increased, and latency, as well as costs, are reduced. Processing within a processor, computer system and/or computing environment is improved.

In one or more aspects, a vector perform sign operation decimal instruction is included in computer code (e.g., COBOL applications and/or applications written in other computer languages) when data is to be truncated, and further when data is to be truncated but the sign code is to be preserved. This may be desired during certain computational processing, in data conversion from one format to another and/or in other processing.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other instructions, instruction formats, operands and/or registers may be used. Moreover, additional, fewer and/or other modules/sub-modules may be used. Although a particular sub-module may be provided as an example of performing a particular operation or task, one or more additional and/or other sub-modules may be used. Sub-modules may be combined and are separated into other sub-modules. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:

a set of one or more computer readable storage media; and program instructions, collectively stored in the set of one or more computer readable storage media, for causing at least one computing device to perform computer operations including:

executing an instruction to obtain a result of the instruction, the result of the instruction including an output value and a result sign code, the instruction including a plurality of controls, the plurality of controls including a preserve sign control to be used to preserve an encoding of a sign code of a source value of the instruction, a sign operation control to be used to indicate a sign operation value, a positive sign code control to be used to indicate a selected sign code to be used to represent a sign of positive and a negative zero control to be used to indicate, based on being set to a chosen value, that a negative zero result is permitted, and wherein the executing the instruction includes:

performing at least one operation on at least a portion of the source value to provide the output value of the result, the source value located in a source location, the source location including a source position to include the source value and a source sign position to include the sign code of the source value;

checking at least the preserve sign control of the plurality of controls of the instruction to determine the result sign code;

determining, based on, at least, the value of the preserve sign control being set to enabled, that the result sign code is the sign code in the source sign position of the source location unmodified;

providing, unmodified, the sign code in the source sign position of the source location as the result sign code; and providing the result, the result including the output value and the result sign code.

2. The computer program product of claim 1, wherein the providing, unmodified, the sign code in the source sign position of the source location as the result sign code includes copying a plurality of digits in the source sign position of the source location as the result sign code.

3. The computer program product of claim 2, wherein the plurality of digits includes a plurality of binary digits copied from the source sign position of the source location regardless of the sign code and regardless of validity of the sign code.

4. The computer program product of claim 1, wherein the at least one operation comprises a move operation in which a selected portion of the source value is placed in one part of the output value of the result.

5. The computer program product of claim 4, wherein based on the move operation, another portion of the source value is truncated in that it is missing from the output value.

6. The computer program product of claim 4, wherein the at least one operation further comprises a truncate operation in which another portion of the source value is missing from the output value and another part of the output value is set to a selected value.

7. The computer program product of claim 6, wherein the selected portion of the source value is a specified number of rightmost digits of the source value, the move operation includes placing the specified number of rightmost digits of the source value into the one part of the output value and the truncate operation includes setting digits of another part of the output value to zero, wherein the output value of the result includes the specified number of rightmost digits of the source value and other digits set to zero.

8. The computer program product of claim 1, wherein the providing the result includes providing the output value and the result sign code in a target location, the target location including a target position to include the output value and a target sign position to include the result sign code.

9. The computer program product of claim 8, wherein the source location is at least one register and the target location is at least one other register.

10. The computer program product of claim 1, wherein the checking the at least the preserve sign control of the plurality of controls of the instruction includes checking the preserve sign control and the sign operation value of the sign operation control to determine that the result sign code is the sign code in the source sign position of the source location unmodified.

11. The computer program product of claim 10, wherein the sign operation value is a maintain operation.

12. The computer program product of claim 1, wherein the computer operations further include executing another instance of the instruction, and wherein based on executing the another instance of the instruction and the value of the preserve sign control being set to unenabled, the checking the at least the preserve sign control of the plurality of controls of the instruction includes checking one or more of the sign operation control, the positive sign code control and the negative zero control to determine the result sign code.

13. The computer program product of claim 1, wherein based on, at least, the value of the preserve sign control being set to enabled, an encoding of the sign code is unmodified.

14. A computer system comprising:

at least one computing device;

a set of one or more computer readable storage media; and program instructions, collectively stored in the set of one or more computer readable storage media, for causing the at least one computing device to perform computer operations including:

executing an instruction to obtain a result of the instruction, the result of the instruction including an output value and a result sign code, the instruction including a plurality of controls, the plurality of controls including a preserve sign control to be used to preserve an encoding of a sign code of a source value of the instruction, a sign operation control to be used to indicate a sign operation value, a positive sign code control to be used to indicate a selected sign code to be used to represent a sign of positive and a negative zero control to be used to indicate, based on being set to a chosen value, that a negative zero result is permitted, and wherein the executing the instruction includes:

performing at least one operation on at least a portion of the source value to provide the output value of the result, the source value located in a source location, the source location including a source position to include the source value and a source sign position to include the sign code of the source value;

checking at least the preserve sign control of the plurality of controls of the instruction to determine the result sign code;

determining, based on, at least, the value of the preserve sign control being set to enabled, that the result sign code is the sign code in the source sign position of the source location unmodified;

providing, unmodified, the sign code in the source sign position of the source location as the result sign code; and providing the result, the result including the output value and the result sign code.

15. The computer system of claim 14, wherein the at least one operation comprises a move operation in which a selected portion of the source value is placed in one part of the output value of the result and a truncate operation in which another portion of the source value is missing from the output value and another part of the output value is set to a selected value.

16. The computer system of claim 14, wherein the providing the result includes providing the output value and the result sign code in a target location, the target location including a target position to include the output value and a target sign position to include the result sign code, and wherein the source location is at least one register and the target location is at least one other register.

17. The computer system of claim 14, wherein the checking the at least the preserve sign control of the plurality of controls of the instruction includes checking the preserve sign control and the sign operation value of the sign operation control to determine that the result sign code is the sign code in the source sign position of the source location unmodified.

18. A computer-implemented method comprising:

executing an instruction to obtain a result of the instruction, the result of the instruction including an output value and a result sign code, the instruction including a plurality of controls, the plurality of controls including a preserve sign control to be used to preserve an encoding of a sign code of a source value of the instruction, a sign operation control to be used to indicate a sign operation value, a positive sign code control to be used to indicate a selected sign code to be used to represent a sign of positive and a negative zero control to be used to indicate, based on being set to a chosen value, that a negative zero result is permitted, and wherein the executing the instruction includes:

performing at least one operation on at least a portion of the source value to provide the output value of the result, the source value located in a source location, the source location including a source position to include the source value and a source sign position to include the sign code of the source value;

checking at least the preserve sign control of the plurality of controls of the instruction to determine the result sign code;

determining, based on, at least, the value of the preserve sign control being set to enabled, that the result sign code is the sign code in the source sign position of the source location unmodified;

providing, unmodified, the sign code in the source sign position of the source location as the result sign code; and providing the result, the result including the output value and the result sign code.

19. The computer-implemented method of claim 18, wherein the at least one operation comprises a move operation in which a selected portion of the source value is placed in one part of the output value of the result and a truncate operation in which another portion of the source value is missing from the output value and another part of the output value is set to a selected value.

20. The computer-implemented method of claim 18, wherein the providing the result includes providing the output value and the result sign code in a target location, the target location including a target position to include the output value and a target sign position to include the result sign code, and wherein the source location is at least one register and the target location is at least one other register.

21. The computer-implemented method of claim 18, wherein the checking the at least the preserve sign control of the instruction includes checking the preserve sign control and the sign operation value of the sign operation control to determine that the result sign code is the sign code in the source sign position of the source location unmodified.

22. A computer program product comprising:

a set of one or more computer readable storage media; and program instructions, collectively stored in the set of one or more computer readable storage media, for causing at least one computing device to perform computer operations including:

executing an instruction to perform one or more operations on a source value included in at least one source register specified using one or more fields of the instruction, the source value including a plurality of digits in a source digits position of the at least one source register and a sign code in a source sign position of the at least one source register, the instruction further including a plurality of controls, the plurality of controls including a preserve sign control to be used to preserve an encoding of the sign code of the source value, a sign operation control to be used to indicate a sign operation value, a positive sign code control to be used to indicate a selected sign code to be used to represent a sign of positive and a negative zero control to be used to indicate, based on being set to a chosen value, that a negative zero result is permitted, the executing the instruction including:

placing a specified number of digits of the plurality of digits in the source digits position of the at least one source register in a target digits position of at least one target register and setting one or more other digits in the target digits position to a selected value;

determining a result sign code to be placed in a target sign position of the at least one target register, the determining including checking at least the preserve sign control of the plurality of controls of the instruction to determine the result sign code, wherein based on, at least, the value of the preserve sign control being set to enabled, the result sign code placed in the target sign position of the at least one target register is the sign code in the source sign position unmodified; and providing an output of the instruction based on execution of the instruction, the output including the at least one target register.

23. The computer program product of claim 22, wherein the specified number of digits is provided in a control of the instruction.

24. A computer program product comprising:

a set of one or more computer readable storage media; and program instructions, collectively stored in the set of one or more computer readable storage media, for causing at least one computing device to perform computer operations including:

executing an instruction to perform one or more operations on a source value included in at least one source register specified using one or more fields of the instruction, the source value including a plurality of digits in a source digits position of the at least one source register and a sign code in a source sign position of the at least one source register, the instruction further including a plurality of controls, the plurality of controls including a preserve sign control to be used to preserve an encoding of the sign code of the source value, a sign operation control to be used to indicate a sign operation value, a positive sign code control to be used to indicate a selected sign code to be used to represent a sign of positive and a negative zero control to be used to indicate, based on being set to a chosen value, that a negative zero result is permitted, the executing the instruction including:

placing a specified number of digits of the plurality of digits in the source digits position of the at least one source register in a target digits position of at least one target register and setting one or more other digits in the target digits position to a selected value;

determining a result sign code to be placed in a target sign position of the at least one target register, the determining including checking at least the preserve sign control of the plurality of controls of the instruction to determine the result sign code, wherein based on the value of the preserve sign control being set to unenabled indicating that the sign code is not being preserved, the checking the at least the preserve sign control includes checking at least one other control of the plurality of controls of the instruction to determine the result sign code to be placed in the target sign position of the at least one target register; and providing an output of the instruction based on execution of the instruction, the output including the at least one target register.

25. The computer program product of claim 24, wherein the at least one other control of the plurality of controls includes the sign operation control, the positive sign code control and the negative zero control.

* * * * *